(12) United States Patent
Elbaum et al.

(10) Patent No.: US 8,972,372 B2
(45) Date of Patent: Mar. 3, 2015

(54) SEARCHING CODE BY SPECIFYING ITS BEHAVIOR

(71) Applicant: NUtech Ventures, Lincoln, NE (US)

(72) Inventors: Sebastian Elbaum, Lincoln, NE (US); Kathryn Stolee, Aimes, IA (US)

(73) Assignee: NUtech Ventures, Lincoln, NE (US)

( * ) Notice: Subject to any disclaimer, the term of this patent is extended or adjusted under 35 U.S.C. 154(b) by 0 days.

(21) Appl. No.: 14/111,956

(22) PCT Filed: Apr. 17, 2013

(86) PCT No.: PCT/US2013/036967
§ 371 (c)(1),
(2) Date: Oct. 15, 2013

(87) PCT Pub. No.: WO2013/158758
PCT Pub. Date: Oct. 24, 2013

(65) Prior Publication Data
US 2014/0108418 A1    Apr. 17, 2014

Related U.S. Application Data

(60) Provisional application No. 61/625,501, filed on Apr. 17, 2012.

(51) Int. Cl.
*G06F 17/30* (2006.01)
*G06F 9/44* (2006.01)

(52) U.S. Cl.
CPC .... *G06F 17/30011* (2013.01); *G06F 17/30864* (2013.01); *G06F 8/70* (2013.01); *G06F 8/36* (2013.01); *G06F 8/74* (2013.01)
USPC ........... 707/706; 707/722; 707/736; 707/755; 717/136

(58) Field of Classification Search
CPC  G06F 8/36; G06F 17/30395; G06F 17/30392
USPC .................................. 717/136, 109
See application file for complete search history.

(56) References Cited

U.S. PATENT DOCUMENTS 7,181,731 B2 * 2/2007 Pace et al. ..................... 717/136
2007/0050343 A1  3/2007 Siddaramappa et al.
(Continued)

OTHER PUBLICATIONS

Paul, A Framework for Source Code Search Using Program Patterns, IEEE Transactions on Software Engineering, vol. 20, No. 6, Jun. 1994, pp. 463-475.*

(Continued)

*Primary Examiner* — Albert Phillips, III
(74) *Attorney, Agent, or Firm* — Fish & Richardson P.C.

(57) ABSTRACT

Systems and methods are disclosed for receiving a first specification that identifies program code behavior associated with a plurality of documents. The specification includes an input-output pair with a first data entity and a second data entity. The systems and methods further include identifying one or more documents, within the plurality of documents, that are configured to (i) use at least a portion of the first data entity as an input to program code associated with particular ones of the documents, and (ii) provide at least a portion of the second data entity as output associated with the program code, wherein the particular ones of the documents correspond to a positive matching between one or more constraints associated with each document and one or more constraints associated with the specification, and generating search results comprising the identified one or more documents.

26 Claims, 13 Drawing Sheets

(56) References Cited

U.S. PATENT DOCUMENTS

| | | | |
|---|---|---|---|
| 2009/0089245 | A1 | 4/2009 | Chi |
| 2010/0106705 | A1* | 4/2010 | Rush et al. ............... 707/709 |
| 2010/0185669 | A1 | 7/2010 | Hall et al. |
| 2011/0271232 | A1 | 11/2011 | Crochet et al. |
| 2011/0283147 | A1* | 11/2011 | Prasad et al. ............. 714/38.1 |
| 2011/0283260 | A1 | 11/2011 | Bucuvalas |
| 2011/0314396 | A1* | 12/2011 | Diab et al. ............... 715/760 |
| 2013/0036129 | A1* | 2/2013 | Havel et al. .............. 707/758 |

OTHER PUBLICATIONS

Soulet, Optimizing Constraint-Based Mining by Automatically Relaxing Constraints, 2005, pp. 1-4.*
Adali, Integrated Search Engine, 1997, pp. 140-147.*
Constraint Satisfaction Problem, Wikipedia, the free encyclopedia, Dec. 5, 2011, pp. 1-6.*
Kotthoff, Constraint Solvers: An Empirical Evaluation of Design Decisions, Jan. 31, 2010, pp. 1-23.*
International Search Report and Written Opinion in International Application No. PCT/US2013/036967m mailed Jul. 15, 2013, 10 pages.
Amazon Mechanical Turk, "Mechanical Turk is a marketplace for work," posted on or before Nov. 3, 2005, accessed on Jan. 10, 2014, http://www.mturk.com/mturk/welcome, 1 page.
Autili et al., "Synthesis: A tool for automatically assembling correct and distributed component-based systems," *Proceedings of the 29th International Conference on Software Engineering*, 2007, 784-787.
Bartolini et al., "Bringing white-box testing to service oriented architectures through a service oriented approach," *Journal of Systems and Software*, 2011 84(4):655-668.
Basili and Elbaum, "Empirically driven se research: state of the art and required maturity," *Proceedings of the International Conference on Software Engineering*, 2006, 32.
Bjorner et al., "Path feasibility analysis for string manipulating programs," *Proceedings of the 15th International Conference on Tools and Algorithms for the Construction and Analysis of Systems, TACAS*, 2009, pp. 307-321.
Chou et al., "A behavior-based classification and retrieval technique for object-oriented specification reuse," *Softw. Pract. Exper.*, Jul. 1996, 26(7):815-832.
Cottrell et al., "Semi-automating small-scale source code reuse via structural correspondence," *International Symposium on Foundations of Software Engineering, SIGSOFT*, 2008, 214-225.
Pipes.deri.org, DERI Pipes: Open Source, Extendable, Embeddable Web Data Mashups, http://pipes.deri.org/, posted on or before Dec. 15, 2007, accessed on Jan. 10, 2014, 2 pages.
Diep et al., "Lattice-based sampling for path property monitoring," *ACM Transactions of Software Engineering Methodologies*, 2012, 43 pages.
Do et al., "Supporting controlled experimentation with testing techniques: An infrastructure and its potential impact," *Empirical Software Engineering: An International Journal*, Oct. 2004, 10(4):405-435.
Dwyer and Elbaum, "Unifying verification and validation techniques: relating behavior and properties through partial evidence," *Foundation of Software Engineering*, 2010, 93-98.
Dwyer et al., "Controlling factors in evaluating path-sensitive error detection techniques," in *Proceedings of the International Symposium on the Foundations of Software Engineering*, 2006, 92-104.
Dwyer et al., "Parallel randomized state-space search.," *Proceedings of the International Conference of Software Engineering*, 2007, 3-12.
Dwyer et al., "Reducing the cost of path property monitoring through sampling," *Proc. of the International Conference on Automated Software Engineering*, 2008, 228-237.
Fisher et al., "Dynamic characterization of web application interfaces," *FASE*, 2007, 260•275.
Elbaum and Hardojo, "Profiling deployed software: assessing strategies and testing opportunities," *IEEE Transactions on Software Engineering*, Apr. 2005, 31(4):312-327.
Elbaum et al., "Bug hunt: Making early software testing lessons engaging and affordable," *Proceedings of the International Conference on Software Engineering*, 2007, pp. 688-697.
Elbaum et al., "Carving differential unit test cases from system test cases," *IEEE Trans. Software Eng.*, 2009, 35(1):29-45.
Elbaum et al., "Helping end-users 'engineer' dependable web applications," *ISSRE*, 2005, pp. 31-40.
Elbaum et al., "Leveraging user session data to support web application testing," *IEEE Transactions on Software Engineering*, Mar. 2005, 31(3):187-202.
Elbaum et al., "Test case prioritization: a family of empirical studies," *IEEE Transactions on Software Engineering*, Feb. 2002, 28(2):159-182.
EUSES: End Users Shaping Effective Software, posted on or about Dec. 6, 2004, accessed Jan. 10, 2014, http://eusesconsortium.org/, 2 pages.
Fischer et al., "Cognitive tools for locating and comprehending software objects for reuse," *Proceedings of the 13th International Conference on Software Engineering, ICSE*, 1991, 318-328.
Frakes and Fox, "Sixteen questions about software reuse," *Communications of the ACM*, 1995, 38(6): 75-87.
Gabel and Su, "A study of the uniqueness of source code," *Foundations of Software Engineering*, 2010, 10 pages.
Garlan et al., "Architectural Mismatch: Why reuse is so hard," *IEEE Softw.*, Nov. 1995, 12:17-26.
Ghezzi and Mocci, "Behavior Model Based Component Search: An Initial Assessment," *ICSE Workshop on Search—driven Development: Users, Infrastructure, Tools and Evaluation (SUITE)*, 2010, pp. 9-12.
Grechanik et al., "Exemplar: Executable Examples Archive," *Proceedings of the 32nd ACM/IEEE International Conference on Software Engineering, ICSE*, 2010, 2:259-262.
Gulwani et al., "Synthesizing Geometry Constructions," *Conference on Programming Language Design and Implementation*, 2011, pp. 50-61.
Holmes et al., "Approximate Structural Context Matching: An approach to recommend relevant examples," *IEEE Trans Softw. Eng.*, Dec. 2006, 32(12):952-970.
Hummel et al., "Code Conjurer: Pulling reusable Software Out of Thin Air," *IEEE Software*, Sep./Oct. 2008, 25(5):45-52.
IBM developerWorks, IBM Mashup Center, posted on or before Dec. 18, 2008, accessed on Jan. 10, 2014, http://www.ibm.comideveloperworks/lotus/products/mashups/, 1 page.
Jackson, "Alloy: a Lightweight Modeling Notation," *ACM Trans. Softw. Eng. Methodol.*, Apr. 2002, 11:256-290.
Jha et al., "Oracle-guided component-based program synthesis," *ACM/IEEE 32nd International Conference*, 2010, 1:215-224.
Jones and Churchill, "Conversations in Developer Communities: a Preliminary Analysis of the Yahoo! Pipes Community," *Proceeding of the 4th International Conference on Communities and Technologies*, 2009, 195-204.
Jorde et al., "Increasing test granularity by aggregating unit tests," in *Proceedings of the International Symposium of Automated Software Engineering*, 2008 9-18.
Kiezun et al., "HAMPI: A Solver for String Constraints," *Proceedings of the Eighteenth International Symposium of Software Testing and Analysis, ISSTA*, 2009, 105-116.
Koesnandar et al., "Using assertions to help end-user programmers create dependable web macros," International Symposium on Foundations of software engineering, 2008, pp. 124-134.
Krueger, "Software reuse," *ACM Comput. Surv.*, Jun. 1992, 24:131-183.
Lazzarini-Lemos et al., "Codegenie: a Tool for Test-driven Source Code Search," *Conference on Object-oriented Programming Systems and Applications Companion*, 2007, pp. 917-918.
Leavens, "Tutorial on jml, The Java Modeling Language," *Proceedings of the Twenty-Second IEEE/ACM International Conference on Automated Software Engineering*, 2007, 573.
Lingam and Elbaum, "Supporting end-users in the creation of dependable web clips," in *Proceeding of the International Conference on World Wide Web*, 2007, 953-962.

(56) References Cited

OTHER PUBLICATIONS

Lorenzoli et al., "Automatic generation of software behavioral models," *Proceedings of the international conference on Software engineering*, 2008, 501-510.

McMillan et al., "Portfolio: Finding Relevant Functions and Their Usage," *International Conference on Software Engineering*, 2011, 111-120.

McMillan et al., "Recommending Source Code Examples via API call Usages and Documentation," *Proceeding of the 2nd International Workshop on Recommendation Systems for Software Engineering*, 2010, 21-25.

Mili et al., "A Survey of Software Reuse Libraries," *Ann. Softw. Eng.*, Jan. 1998, 5:349-414.

Penix and Alexander, "Efficient Specification-based Component Retrieval," *Automated Softw. Engineering*, Apr. 6, 1999, pp. 139-170.

Person et al., "Differential symbolic execution," Proc. of the International Symposium on Foundations of Software Engineering, 2008, 226-237.

Podgurski and Pierce, "Retrieving Reusable Software by Sampling Behavior," *ACM Trans. Softw. Eng. Methodol.*, Jul. 2, 1993 pp. 286-303.

Purandare et al., "Monitor optimization via stutter-equivalent loop transformation," *Proceedings of the Conference on Object-oriented Programming Systems, Languages, and Applications*, 2010, 270-285.

Reiss, "Semantics-based Code Search," *Proceeding of the International Conference on Software Engineering*, 2009, 243-253.

Rosson and Carroll, "The reuse of uses in smalltalk programming," *ACM Trans. Comput.-Hum. Interact.*, Sep. 1996, 3:219-253.

Rothermel and Elbaum, "The first workshop on end-user software engineering," *ICSE*, 2005, 698.

Rothermel et al., "On test suite composition and cost-effective regression testing," ACM Transactions of Software Engineering and Methodologies, Jul. 2004, 13(3):277-331.

Ruthruff et al., "Predicting accurate and actionable static analysis warnings: an experimental approach," in *ICSE*, 2008, 341-350.

Ruthruff et al., "Experimental program analysis," *Information & Software Technology*, 2010, 52(4):359-379.

Sama et al., "Context-aware adaptive applications: Fault patterns and their automated identification," *IEEE Trans. Software Eng.*, 2010, 36(5):644-661.

Selby, "Enabling reuse-based software development of large-scale systems," *IEEE Trans. Software Eng.*, 2005, 495-510.

Sherman et al., "Saturation-based testing of concurrent programs," ESEC/SIGSOFT FSE, 209, 53-62.

Sim et al., "How Well Do Search Engines Support Code Retrieval on the Web?" ACM Trans. Softw. Eng. Methodol., Dec. 2011, 21(1):4:1-4:25.

Stackoverflow, Dec. 2011, retrieved Jan. 14, 2014, http://stackoverflow.com/, 6 pages.

Stolee and Elbaum, "Refactoring Pipe-like Mashups for End-user Programmers," *International Conference on Software Engineering*, 2011, 10 pages.

Stolee and Elbaum, "Exploring the use of crowdsourcing to support empirical studies in software engineering," *International Symposium on Empirical Software Engineering and Measurement*, 2010, 4 pages.

Stolee and Fristoe, "Expressing computer science concepts through kodu game lab," Technical Symposium on Computer Science Education(SIGCSE), 2011, pp. 99-104.

Stolee et al., "End-user Programmers and Their Communities: an Artifact-based Analysis," Proceedings of the 2011 International Symposium on Empirical Software Engineering and Measurement, 2011, 14-156.

Stolee et al., "Revealing the copy and paste habits of end users," *Symposium on Visual Languages and Human-Centric Computing*, 2009, 8 pages.

Stolee, "Analysis and transformation of pipe-like web mashups for end user programmers," Computer Science and Engineering: Theses Dissertations, and Student Research, Jun. 2010, 130 pages.

Veanes et al., "Qex: Symbolic sql Query Explorer," *Logic for Programming, Artificial Intelligence, and Reasoning*, 2010, 425-445.

Wang et al., "Automated generation of context-aware tests," Proceedings of the International Conference on Software Engineering, 2007, 406-415.

Yahoo! Pipes, "About Pipes," Feb. 2011, retrieved Jan. 14, 2014, http://pipes.yahoo.com/pipes/, 1 page.

Z3: Theorem Prover, Nov. 2011, retrieved Jan. 14, 2014, http://z3.codeplex.com/, 2 pages.

Zaremski and Wing, "Specification Matching of Software Components," *ACM Trans. Softw. Eng. Methodol.*, Oct. 6, 1997, pp. 1-38.

Zhang et al., "Automatic generation of load tests," *Proceedings of the International Automated Software Engineering Conference*, 20111, 43-52.

International Preliminary Report on Patentability in International Application No. PCT/US2013/036967, mailed Oct. 30, 2014.

* cited by examiner

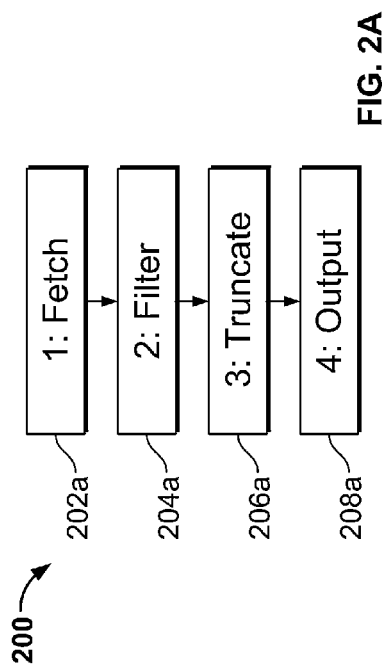

FIG. 2A

| Module | Constraint Type | Constraint Def | |
|---|---|---|---|
| 1 | Equality | out1 = input | 202b |
| Link (1,2) | Equality | in2 = out1 | 202c |
| 2 | Inclusion | $(x \in in2 \wedge x.p = c) \Rightarrow x \in out2$ | 204b |
|   | Exclusion | $\forall x \in out2 \Rightarrow x \in in2$ | |
|   | Order | $\forall x,y \exists w, z \mid (x,y \in out2) \wedge (w, z \in in 2)$ $\wedge (x<y) \wedge (x<z) \wedge (x=w) \wedge (y=z)$ | |
| Link (2,3) | Equality | in3 = out2 | 204c |
| 3 | Inclusion | $(x \in in3 \wedge index(x) \leq 5) \Rightarrow x \in out3$ | 206b |
|   | Exclusion | $x \in out3 \Rightarrow x \in in3$ | |
|   | Order | $\forall x,y \exists w,z \mid (x,y \in out3) \wedge (w,z \in in3)$ $\wedge(x<y) \wedge (w<z) \wedge (x=w) \wedge (y=z)$ | |
| Link (3,4) | Equality | in4 = out3 | 206c |
| 4 | Equality | output = in4 | 208b |

FIG. 2B

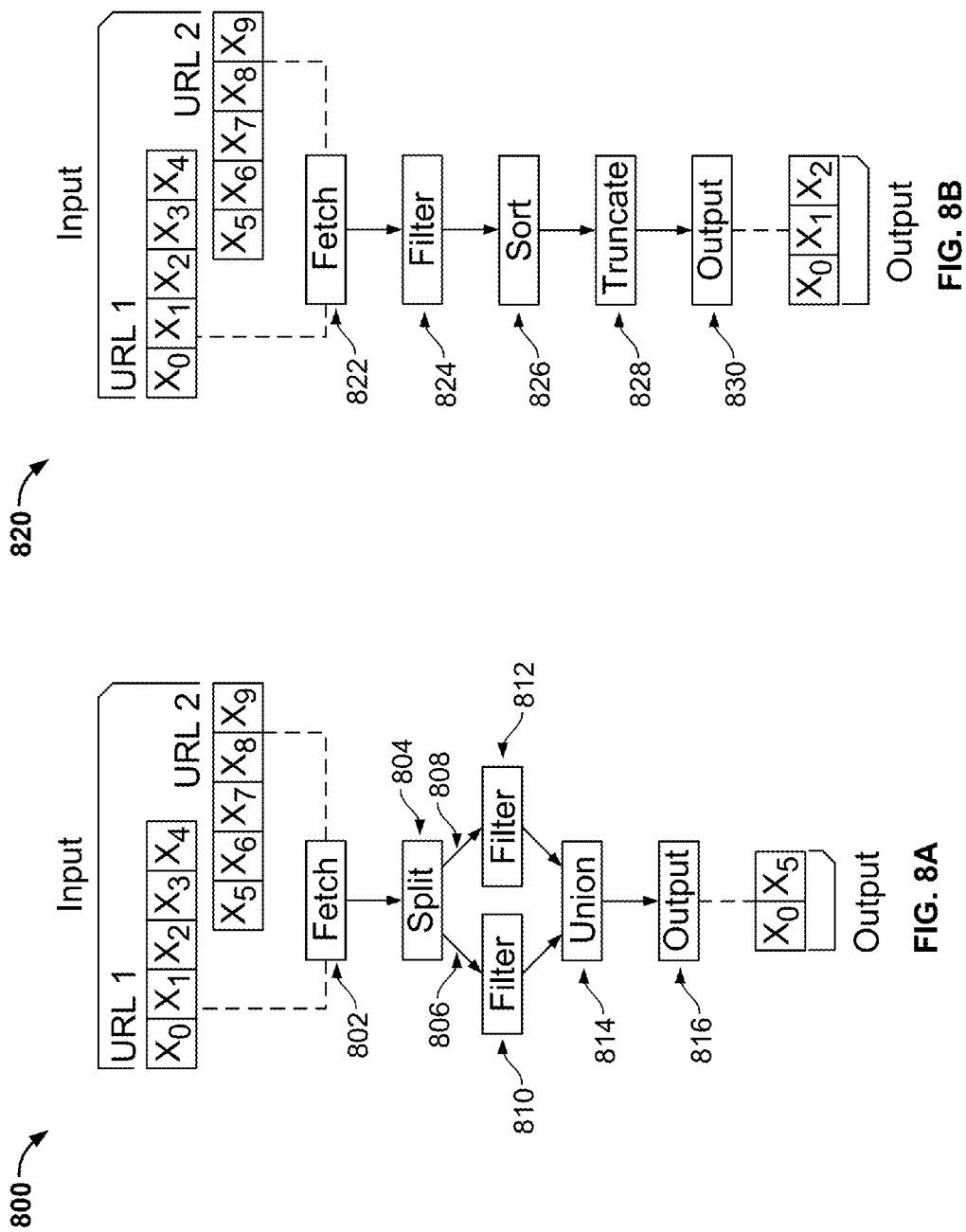

INPUT: HTTP://NEWS.RSS.BBC.CO.UK/RSS/SPORTONLINE_UK_EDITION/TENNIS/RSS.XML
⇨ RETRIEVE RSS FEED
902

ITEM 1
904
TITLE  QUERREY SHOCKS DJOKOVIC IN PARIS
DESCRIPTION  NOVAK DJOKOVIC COLLAPSES TO A THREE-SET DEFEAT BY AMERICAN SAM QUERREY IN THE SECOND ROUND OF THE PARIS MASTERS.
LINK  HTTP://WWW.BBC.CO.UK/SPORT/0/TENNIS/20158146
PUBLICATION DATE  WED, 31 OCT 2012 16:58:15 GMT

ITEM 2
906
TITLE  QUERREY SHOCKS DJOKOVIC IN PARIS
DESCRIPTION  ANDY MURRAY IS FULLY COMMITTED TO THE PARIS MASTERS, DESPITE THE SEASON-ENDING ATP WORLD TOUR FINALS STARTING ON MONDAY.
LINK  HTTP://WWW.BBC.CO.UK/SPORT/0/TENNIS/20128126
PUBLICATION DATE  TUE, 30 OCT 2012 14:07:54 GMT

ITEM 3
908
TITLE  HOPE FOR BRITISH WOMEN'S TENNIS
DESCRIPTION  BBC SPORT'S JONATHAN OVEREND SAYS THERE IS "A LOT OF OPTIMISM" IN BRITISH WOMEN'S TENNIS, THANKS TO PERFORMANCES FROM HEATHER WATSON AND LAURA ROBSON.
LINK  HTTP://WWW.BBC.CO.UK/SPORT/0/TENNIS/19945696
PUBLICATION DATE  MON, 15 OCT 2012 19:19:29 GMT

ITEM 4
910
TITLE  WILLIAMS AND SHARAPOVA INTO FINAL
DESCRIPTION  SERENA WILLIAMS AND MARIA SHARAPOVA WIN THEIR SEMI-FINALS AND WILL MEET IN SUNDAY'S FINAL OF THE WTA CHAMPIONSHIPS.
LINK  HTTP://WWW.BBC.CO.UK/SPORT/0/TENNIS/20110075
PUBLICATIONDATE  SAT, 27 OCT 2012 17:02:11 GMT

...

ITEM N
912
TITLE  DEL POTRO EDGES FEDERER IN BASLE
DESCRIPTION  JUAN MARTIN DEL PORTO BEATS WORLD NUMBER ONE ROGER FEDERER IN THREE SETS TO WIN THE SWISS INDOORS TITLE IN BASLE.
LINK  HTTP://WWW.BBC.CO.UK/SPORT/0/TENNIS/20116096
PUBLICATION DATE  SUN, 28 OCT 2012 16:26:25 GMT

OUTPUT: SELECTED RSS ITEMS

ITEM 3
TITLE  HOPE FOR BRITISH WOMEN'S TENNIS
DESCRIPTION  BBC SPORT'S JONATHAN OVEREND SAYS THERE IS "A LOT OF OPTIMISM" IN BRITISH WOMEN'S TENNIS, THANKS TO PERFORMANCES FROM HEATHER WATSON AND LAURA ROBSON.
LINK  HTTP://WWW.BBC.CO.UK/SPORT/0/TENNIS/19945696
PUBLICATION DATE  MON, 15 OCT 2012 19:19:29 GMT
908

FIG. 9A

| Module | Encoding as Constraints |
|---|---|
| Fetch$_1$ (916) | c1: (assert (in(Fetch$_1$) = URL$_1$) )<br>c2: (assert (out(Fetch$_1$) = in(Fetch$_1$) ) ) |
| Fetch$_2$ (918) | c3: (assert (in(Fetch$_2$) = URL$_2$) )<br>c4: (assert (out(Fetch$_2$) = in(Fetch$_2$) ) ) |
| wire$_1$ (920) | c5: (assert (in(Union$_1$) = out(Fetch$_1$) ) ) |
| wire$_2$ (922) | c6: (assert (in(Union$_2$) = out(Fetch$_2$) ) ) |
| Union (924) | c7a: (assert (for (0 ≤ i < size (in(Union$_1$) ) )<br>    recOf(out(Union), i) = recOf(in(Union$_1$), i) ) )<br>c7b: (assert (for (size(in(Union$_1$) ) ≤ i < (size(in(Union$_1$) ) + size(in(Union$_2$) ) ) )<br>    recOf(out(Union), i) = recOf(in(Union$_2$), (i - size(in(Union$_1$) ) ) ) ) ) )<br>c8: (assert (for (0 ≤ i < size(out(Union) ) )<br>    (hasRec(in(Union$_1$), recOf(out(Union), i) ) = true)<br>    ∨ (hasRec(in(Union$_2$), recOf(out(Union), i) ) = true) ) ) |
| wire$_3$ | c9: (assert (in(Filter) = out(Union) ) ) |
| Filter (914) | c10: (assert (for (0 ≤ i < size(in(Filter) ) )<br>    ( (recOf(in(Filter), i) = r) ∧ contains(field(r "descr"), "tennis") )<br>    ⇒ (hasRec(out(Filter), r) = true) ) )<br>c11: (assert (for (0 ≤ i < size(out(Filter) ) )<br>    (hasRec(in(Filter), recOf(out(Filter), i) ) = true) ) )<br>c12: (assert (for (0 ≤ i < size(out(Filter) ) )<br>    (for (i < j < size(out(Filter) ) )<br>    ( (recOf(out(Filter), i) = r$_1$) ∧ (recOf(out(Filter), j) = r$_2$) )<br>    ⇒ (∃ k, l ( (k < l)<br>    ∧ (0 ≤ k < size(in(Filter) ) ) ∧ (0 ≤ l < size(in(Filter) ) )<br>    ∧ (recOf(in(Filter), k) = r$_1$)<br>    ∧ (recOf(in(Filter), l) = r$_2$) ) ) ) ) ) |
| wire$_4$ (926) | c13: (assert (in(Output) = out(Filter) ) ) |
| Output (928) | c14: (assert (out(Output) = in(Output) ) ) |

Definitions: Let l be a List, i be an Integer, r be a record, and $s_1$, $s_2$ be strings
    contains($s_1$, $s_2$) = true ⇔ $s_2$ ⊆ $s_1$
    recOf(l,i) = r ⇔ l[i] = r
    hasRec(l,r) = true ⇔ ∃i | ((0 ≤ i < size(l)) ∧ (l[i] = r))

FIG. 9B

SEARCHING CODE BY SPECIFYING ITS BEHAVIOR

CROSS-REFERENCE TO RELATED APPLICATION

This application is a National Stage Application under 35 U.S.C. §371 and claims the benefit of International Application No. PCT/US2013/036967, filed Apr. 17, 2013, which claims priority to U.S. Application No. 61/625,501, filed Apr. 17, 2012, entitled SEARCHING CODE BY SPECIFYING ITS BEHAVIOR, the disclosures of which are incorporated herein by reference.

GOVERNMENT LICENSE RIGHTS

This invention was made with government support under National Science Foundation, Award: 1218265, Searching for Code in Large Repositories with Lightweight Specifications, 2012, 2015; Air Force Office for Scientific Research, Award #FA9550-10-1-0406, Safeguarding End-User Military Software, 2010-2014; National Science Foundation, Award: 0915526, T2T: A Framework for Amplifying Testing Resources, 2009-2012; National Science Foundation Fellowship under CFDA-47.076. The government has certain rights in the invention.

TECHNICAL FIELD

This disclosure relates to document searching and more particularly to finding source code that matches specifications that describe functional behavior carried out by the source code.

BACKGROUND

Source code is developed by programmers according to their specific annotations and naming conventions, and generally stored on servers for sharing. Each programmer can choose a preferred way of commenting source code and selecting file names, variables, and other code content. The source code naming conventions selected by one programmer may not have the same meaning with another programmer and thus, particular pieces of source code may not be provided in search results for the programmer who does not correctly predict the meaning of the conventions used by another programmer.

Searching for relevant source code is a common task among programmers, with the ultimate goal of finding and reusing code drafted by other programmers, or obtaining ideas for implementation of their own software programs. Programmers can access search engines and enter keywords that they believe may be found in the stored code. For example, a programmer can enter search queries in the form of keywords, such as "Best way to do combine two arrays in JAVA?" or "Can I do a merge with/without arrays of the same size?" or "How do I . . . ?" or "extract alias from email address in JAVA" or "extract, alias, and email," just to name a few examples. The search engine can take the entered search query, compare the keywords in the query to keywords in stored source code, and provide search results if the comparison results in a match of keywords to source code.

SUMMARY

Systems and methods are disclosed for enabling semantic searching of source code in response to receiving specification data from programmers (i.e., developers) and providing search results to such developers. In general, a developer may provide specification data for purposes of finding suitable source code examples. The source code may be indexed according to a scheme that allows the systems in this disclosure to find the source code using the received specification data.

In one implementation, a computer implemented method of providing search results is disclosed. The method includes receiving a first specification that identifies program code behavior associated with a plurality of documents. The specification includes an input-output pair including a first data entity and a second data entity. In some implementations, the specification is a Uniform Resource Locator (URL) and the first data entity includes one or more RSS feeds and the second data entity includes a subset of the RSS feeds that match the specification. The first data entity and the second data entity may each include multiple and distinct data components. In some implementations, the first data entity and the second data entity are selected from the group consisting of integers, strings, Booleans, characters, files, arrays, lists, maps, and tables. In some implementations, the first data entity includes an input of a first file type and the second data entity includes an output of a second file type. In some implementations, the first data entity is a file and the second data entity is a linked list in which each node of the linked list includes content in the file and one or more additional rows of data. In some implementations, the first data entity is one or more database tables and the second data entity is a portion of the one or more database tables. In some implementations, the first data entity is an extensible markup language (XML) file type and the second data entity is a Structure Query Language (SQL) file type. In some implementations, the first data entity is a file and the second data entity includes an integer and a Boolean data type.

The method above further includes identifying one or more documents, within the plurality of documents, that are configured to (i) use at least a portion of the first data entity as an input to program code associated with particular ones of the documents, and (ii) provide at least a portion of the second data entity as output associated with the program code. The particular ones of the documents may correspond to a positive matching between one or more constraints associated with each document and one or more constraints associated with the specification and generating search results that include the identified one or more documents and providing the search results to a user.

In some implementations, the method also includes automatically encoding each of the plurality of documents into a set of constraints using symbolic analysis of at least a portion of semantics within one or more programs, wherein symbolic analysis includes characterization of behaviors associated with a program's source code. In some implementations, the method further includes receiving one or more additional specifications and refining the search results based on the additional specifications, and generating and providing the refined search results to the user.

In another implementation, a computer implemented system is disclosed that includes one or more computers and one or more storage devices storing instructions that are operable, when executed by the one or more computers, to cause the one or more computers to perform operations that include receiving a first specification that identifies program code behavior associated with a plurality of documents, wherein the specification comprises an input-output pair including a first data entity and a second data entity, identifying one or more documents, within the plurality of documents, that are configured to (i) use at least a portion of the first data entity as an input to program code associated with particular ones of the documents, and (ii) provide at least a portion of the second data entity as output associated with the program code, wherein the particular ones of the documents correspond to a positive matching between one or more constraints associated with each document and one or more constraints associated with the specification, and generating search results comprising the identified one or more documents and providing the search results to a user. In some implementations, the first data entity and the second data entity each comprise multiple and distinct data components. In some implementations, the first data entity includes an input of a first file type and the second data entity includes an output of a second file type. In some implementations, the first data entity is a file and the second data entity is a linked list in which each node of the linked list includes content in the file and one or more additional rows of data. In some implementations, the specification is a Uniform Resource Locator (URL) and the first data entity includes one or more RSS feeds and the second data entity includes a subset of the RSS feeds that match the specification. In some implementations, the specification's first entity is one or more database tables and the second entity is a portion of the one or more database tables. In some implementations, the first data entity is an extensible markup language (XML) file type and the second data entity is a Structure Query Language (SQL) file type. In some implementations, the first data entity is a file and the second data entity includes an integer and a Boolean data type.

In some implementations, the system can also automatically encode each of the plurality of documents into a set of constraints using symbolic analysis of at least a portion of semantics within one or more programs, wherein symbolic analysis includes characterization of behaviors associated with a piece of source code. In some implementations, the system can also receive one or more additional specifications and refine the search results based on the additional specifications, and generate and provide the refined search results to the user.

In yet another implementation, a computer implemented system is disclosed. The system includes an encoder module configured to map program code to one or more constraints, and generate mapped program code, the mapping based at least in part on a predetermined behavior for the program code, a solver module configured to determine whether portions of the mapped program code match one or more of a plurality of user-identified specifications and identify one or more sets of program code that match a particular user-identified specification from the plurality of user-identified specifications, and a refiner module configured to incrementally refine the stored source code. The encoder module may be adapted to modify an indexing scheme associated with the program code, wherein the modified indexing scheme corresponds to the predetermined behavior for the program code. In some implementations, the system can also include a constraint relaxer module adapted to relax one or more constraints, and wherein the solver module identifies approximate matches between the one or more user-identified specifications and one or more sets of program code, based on the relaxed constraints.

In yet another implementation, a computer implemented method of providing search results is disclosed. The method includes identifying a plurality of documents that are indexed according to a first scheme and associated with a first set of information, generating a second scheme that associates, based on predefined mapping information, the first set of information with a second set of information, and indexing the plurality of documents according to the second scheme and storing the documents in a repository according to the second scheme. In response to receiving a specification, the method includes identifying one or more documents, within the plurality of documents, that match a constraint associated with the specification and the second scheme, the specification comprising a first data entity associated with a second data entity, and generating search results comprising the identified one or more documents and providing the search results to a user.

In some aspects, identifying the one or more documents that match the constraint associated with the specification includes using a Satisfiability Modulo Theory (SMT) solver to iteratively determine matches between the one or more documents and the constraint associated with the specification. In some implementations, identifying the one or more documents that match the constraint associated with the specification can include determining whether using the first data entity as an input argument to program code encoded in the form of constraints, and associated with particular ones of the documents results in an output argument represented within the second data entity. In some implementations, the method includes relaxing matching criteria associated with the constraint and using a Satisfiability Modulo Theory (SMT) solver and the relaxed matching criteria to identify one or more additional documents, and generating search results comprising the additional one or more documents and providing the search results to a user. The additional documents may represent documents that approximately match the constraint. In some implementations, the first data entity is a file and the second data entity is a linked list. In some implementation, the constraints comprise inclusion constraints, exclusion constraints, or order constraints. In some implementations, the first scheme is adapted to index documents according to a plurality of keywords associated with the one or more documents and the second scheme is adapted to index documents using an information hierarchy with a plurality of specifications, document indices, and lexicons for classifying details associated with an intended function of source code in the one or more documents.

Advantageously, the described systems and techniques may provide for one or more benefits, such as defining an approach to search for code with lightweight specifications using a constraint solver (e.g., a Satisfiability Modulo Theory (SMT) solver) to identify matching code and illustrating the feasibility and success of this approach using different programming domains including, but not limited to the YAHOO! PIPES domain, SQL queries, JAVA models, traditional programming languages (e.g., JAVA, C, C++, C#, Assembly, Basic), and/or combinations of some or all of the above. Another advantage of the systems and techniques may include providing characterization of how developers use search queries to find source code and to ascertain which questions, asked by developers, are not easily satisfied by keyword-driven search techniques. Such information can be used to increase the likelihood of providing meaningful search results to the developer. Additional advantages may include the ability to assess how search results are selected based on a cost of providing a number of matches for particular specifications, time used for search result retrieval, and effectiveness of a particular search in identifying accurate matches between specifications and source code search results.

The details of one or more embodiments are set forth in the accompanying drawings and the description below. Other

DESCRIPTION OF DRAWINGS

FIGS. 2A-2B are conceptual diagrams showing an example of mapping source documents to constraints.

FIGS. 8A-8E illustrate example representations of pipes used to derive input and output lightweight specifications used to find source code.

FIGS. 9A-9B represent conceptual diagrams showing an example implementation of input and output specifications in the YAHOO! PIPES domain.

Like reference symbols in the various drawings indicate like elements.

DETAILED DESCRIPTION

Typically, developers (i.e., programmers/users) rely on keyword-based search engines to find code to reuse in their own designs or to research a best mode of implementing an idea in code, for example. In some situations, the search may become overwhelming and frustrating if, for example, the developer receives a large number of search results that are not relevant to their task when attempting a keyword-driven search for a particular program (e.g., source code). To reduce the possibility of being provided too many search results, the developer can attempt to manually refine the search query by guessing at more keywords or modifying keywords such that fewer results are provided. However, such a method can become tedious to implement for each and every search request. The systems and techniques described in this document provide a mechanism for developers to use search engines and quickly gather desired code by enabling incremental semantic searching functionality in which a developer provides lightweight specifications, an encoder maps programs to constraints, and a solver identifies which encoded programs match the specifications.

Determining suitable source code that aligns with user-entered specifications may include comparing portions of the specifications to known repositories of source code. Such repositories may be part of an internet, intranet, Local Access Network (LAN), and/or a Virtual Private Network (VPN). In addition, the repositories can be found as part of an online community, and/or may include online search repositories, open source code repositories, public or private software artifact repositories (i.e., software artifacts may include documents, requirements, and source code associated with software), manipulated search repositories, private search repositories, re-indexed search repositories, and/or other known code storage space or any combination of the above. In some implementations, particular repositories can be manipulated, combined, and/or restructured to increase the likelihood of finding documents stored in the repositories. For example, repositories of source code can be indexed according to a number of schemes to enable a user to find source code in an accurate and timely fashion. Examples of indexing according to such schemes are described below.

Figure 1:
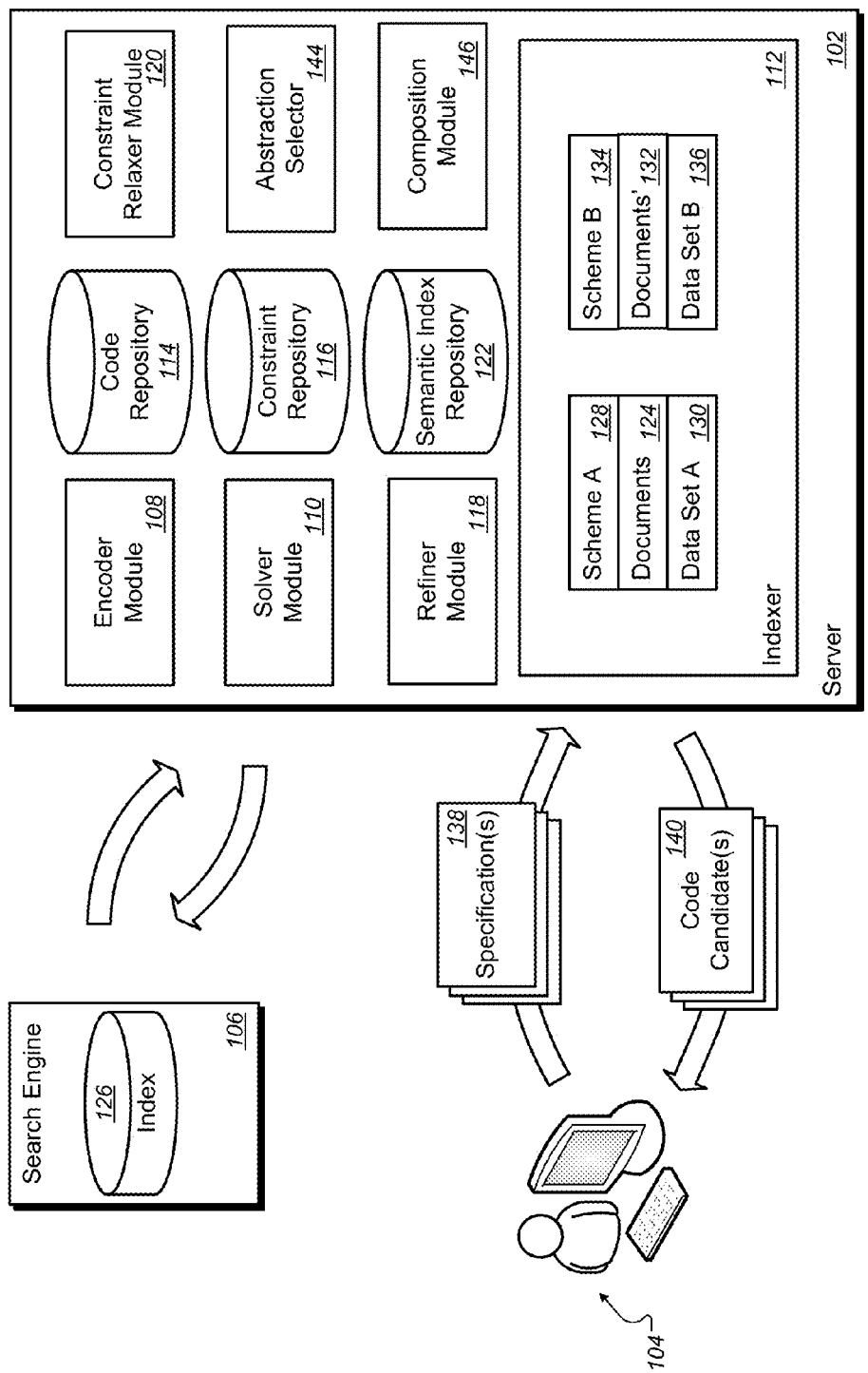
FIG. 1 is a conceptual diagram of a system for providing search results.

FIG. 1 is a conceptual diagram of a system 100 for providing search results. In general, the system 100 allows a user (e.g., a developer) to search for source code and data related to source code by providing a search request to server 102. The search request may include specification data correlated to desired source code behavior. The specification data represent arguments (e.g., inputs and/or outputs) that characterize desired behavior of particular source code that the user may be searching for. For example, the specification data entered by a developer may include constants, variables, equations, pseudocode, formulas, files, file structures, lists, objects, tables, or any combination of the above. The received search request (in the form of specification data) can be analyzed by components in system 100 in order to return search results that are responsive to the specification data.

In some implementations, specification data can take the form of a number of Uniform Resource Locators (URLs) that reference Rich Site Summary (RSS) feeds which can provide lists of records (i.e., input) and desired records from the feeds (i.e., output). In operation, RSS feeds can be accessed when a particular mashup is executed and so the developer may be searching for example source code that, when executed, outputs specific RSS feeds or feed types. As such, the developer can specify one or more URLs that may generate one or more RSS feeds or content from such feeds. In this example, the URLs provided by the developer can constitute specification data, as used in system 100.

Upon receiving specification data from the developer, the system 100 can parse the data into a data set that can be submitted to a search engine 106. One example technique used by system 100 includes matching the specification data to particular source code behavior. For example, system 100 can recognize that certain specification data items represent input data and other specification data items represent output data, and can provide such data to a search engine to determine a match between the data and stored source code. For example, the developer may provide a specification that includes a file with a row of numbers indicating temperatures with one row including example integers "32" and "0" and another row including integers "75" and "24." The system 100, and in particular, the modules in server 102, can deduce that the developer may be trying to find source code that converts a table of Fahrenheit temperatures into a table of Celsius temperatures. Namely, the system 100 uses received specification data and other data techniques to determine a desired behavior (e.g., in this example converting temperature) for source code under search and attempts to match the desired behavior to actual known source code.

In a specific example, the system 100 can use an input-output pair to determine whether previously stored source code takes an input from the specification data (e.g., "32") and produces an output (e.g., "0"), where the output is also part of the specification data. If a particular snippet of code adheres to the specification data or data requirements, the source document that houses the code can be provided to the user as a search result. One example snippet of code that would adhere to the entered specification data would include a program that includes an equation or function for converting a table of Fahrenheit temperatures into Celsius temperatures. Another example snippet of code that would meet the entered specification may include a program that converts a temperature reading from Fahrenheit into Celsius if, for example, predefined temperature swings are exhibited in the input specification data. Any number of documents that include source code responsive to the search query (e.g., the specification data) can be provided to the user as a list of search results. The search results can, for example, include documents or files containing source code, instructions, code, requirements, forum data, blog data, website data, social networking data, and/or comments.

Turning to FIG. 1, the server 102 includes an encoder module 108, a solver module 110, and an indexer 112 that can be used in conjunction with code repository 114. The encoder module 108 functions to encode existing source code (e.g., program code) as constraints. That is, the encoder module 108 is configured to map program code to one or more constraints, and generate mapped program code that is searchable using a search engine. The mapping may be based at least in part on a predetermined behavior for the program code. In one example, the encoder module 108 can encode/map code stored in code repository 114 into constraints that can be stored in constraint repository 116. At a later time, when a user provides a specification, the encoder module 108 can encode the specification as a constraint and use a constraint solver (e.g., SMT solver) to identify source code in the code repository 114 that matches the specifications. In some implementations, repository 114 represents a source code repository, and repository 116 represents an encoded repository that results when repository 114 is processed through encoder module 108. In addition, the constraint repository 116 represents the content in repository 114 in a different format.

In some implementations, source code stored in the code repository 114 is encoded by a combination of constraints so that any number of specifications can be matched to code using combinations of constraints. In addition, a mechanism to relax constraints is provided by constraint relaxer module 120 so that approximate matches can be identified when an exact match between particular specifications and source code cannot be found. For example, when a particular specification cannot be matched by server 102, the constraint relaxer module 120 can be used to identify a closest match available and attempt to use the search capabilities again to combine that match with other available code to approximately match the specification and provide an approximate search result to a user.

The solver module 110 can analyze received specification data and search an encoded code repository, such as repository 116 to find a program that satisfies the specifications in the specification data. The analysis performed by solver 110 can be carried out in an iterative fashion. For example, if the solver module 110 determines that a size of particular specification data is a predictor of solving time, then a search can be performed using a subset of the specification data to quickly discard clearly irrelevant search results which do not match the size indication. After narrowing the data to a subset, the solver module 110 can perform a search query using the subset as a pool of data. In some implementations, the solver module 110 can continue to narrow subsets of data using other constraints or criteria found in the specification data.

The indexer 112 functions to index web pages containing source code and/or data related to source code. In general, the indexer 112 can index programs in code repository 114 in the form of constraints. Indexed data may be stored in semantic index repository 122. In some implementations, the indexer 112 may function as part of encoder module 108. That is, the encoder module 108 may be adapted to modify an indexing scheme associated with particular program code. The modified indexing scheme can generally correspond to a predetermined behavior for the program code. Index modification is discussed in detail below.

In some implementations, the indexer 112 can re-index web pages or documents according to another indexing scheme. For example, indexer 112 can input documents 124 from index 126 in search engine 106. The inputted documents 124 generally take the form of standard web indexed documents that were previously indexed according to specific keywords which correspond to the respective documents. The inputted documents 124 shown in FIG. 1 may be indexed according to this scheme, labeled here as "scheme A" 128 using "data set A" 130. Here, "scheme A" 128 may refer to a type of indexing scheme and "data set A" 130 may refer to a list of data associated with the indexing scheme. For example, "data set A" 130 may be a list of keywords that are associated with documents 124 according to "scheme A" 128. In general, the indexer 112 can input documents 124 and re-index the documents 124 into a set of documents 132 that are indexed according to other schemes. Namely, the indexer 112 can index documents 124 according to a "scheme B" 134 corresponding to a "data Set B" 136, where "scheme B" 134 refers to a semantic indexing scheme and "data set B" 136 refers to a set of semantic constraints that can be associated with the documents 124. Performing the re-indexing using index 112 can result in translating documents 124 into documents 132, where the translation pertains to metadata that describes the documents 132. The metadata may include specification data, constraints, comments, code behavior or other features represented in source code available in the documents 132.

Server 102 also includes a refiner module 118 and a constraint relaxer module 120. The refiner module 118 can function to refine search results according to user-entered specifications. The constraint relaxer module 120 can function to analyze stored source code and determine which constraints can be relaxed in order to produce targeted results. In some implementations, the constraint relaxer module 120 may be adapted to relax multiple constraints. If such constraints are relaxed, the solver module 110 can identify approximate matches between one or more user-identified specifications and one or more sets of program code. In some implementations, the constraint relaxer module can operate on the encoded source code. Additional example functionality for components in server 102 will be discussed in detail below.

Server 102 additionally includes an abstraction selector 144. The abstraction selector 144 can be used in combination with the solver module 110. In particular, the abstraction selector 144 can set an abstraction level for particular search parameters to invoke the solver module 110 for a given specification and encoded program. The encoding occurs at a set abstraction level and the initial encodings are as concrete as possible. In addition, weaker encodings that replace concrete values with symbolic ones can also be computed and used. In some implementations, the relaxer module 120 can use the abstraction selector 144 to guide constraint relaxations on the source code.

Referring to FIG. 1, in operation, a user 104 submits one or more specifications 138 to server 102. The server 102 parses the specifications into one or more input and one or more output that may define particular code behaviors. For example, inputs and outputs can be paired into one or more input-output pairs. The parsed specifications can be analyzed by encoder 108, solver 110, and/or indexer 112. Specifications and/or source code can be mapped to constraints. The server 102 can then perform a search for source code in code repository 114, for example, that matches the constraints. The search results (i.e., code candidates 140) can be provided to the user 104. If the user 104 wishes to further refine search results, she can provide additional specifications and receive additional code candidates 140. Alternatively, the server 102 can further refine search results using one or more modules shown in server 102.

As an example, a developer (e.g., user 104) may provide a specification in system 100 that includes the number "3" as input and the number "9" as output. The components in server 102 can deduce that the user is searching for source code that can use the number "3" as input and produce the number "9" as output. As such, the server 102 can perform a search for source code that, when executed, returns the desired output. In this example, a desired output of "9" can be reached by an equation, such as "input+6" (e.g., 3+6) or similarly source code that performs a square of the input "input$^2$" (e.g., $3^2$), or any other program code that returns "9" when the input is "3." In the event that no matching source code exists in the code repository 114, the server 102 can approximate matches or relax constraints accordingly. Continuing with the example above, the server 102 can find a program that returns (input$^3$−1) and perform a constraint relaxation for the "−1" to obtain source code that returns (input$^3$−n), where "n" provides a constraint that adheres to the original input-output specification requirement. That is, if n=18, the input can remain "3" and the output would still be "9," and relaxing the constraint on a known program can provide the user with source code that also adheres to the original input-output specification.

In another example, a developer (e.g., user 104) may provide a file as input and specify, as output, a linked list in which each node of the linked list includes content in the input file and one or more additional rows of data. That is, the server 102 can determine whether or not code repository 114 includes source code that reads a file and populates a linked list with the file content, but also ignores the first row of the file. By relaxing the bounds on the iteration over the file contents to yield a linked list with all rows from the file, as the developer indicated in the specification, this code would be a match.

In a similar example, the developer could instead enter a specification in which an input is a Structure Query Language (SQL) table and the output is the same SQL table that also includes one or more additional rows of data. The same constraint relaxation concept can be applied to obtain source code that meets the specification criteria entered by the user.

An example implementation of providing search results that include suitable source code is described. This example is described in connection with FIG. 1 architecture; however, other implementations can be used. In this example, a developer may wish to enter a search query to find example source code that can accomplish the task of creating a web mashup to find Canon cameras on EBAY, AMAZON, and GOOGLE PRODUCT SEARCH that are priced between $100 and $500. The developer can enter such a request and the search engine 106 can provide search results that may assist the developer with examples for writing code to accomplish the task. However, search engine 106 will likely use keyword matching to accomplish such a task since typical search engines focus on keyword or structural information like class name and tags when searching code. As such, the search results may provide results that do not include source code and/or do not answer the developer's query appropriately. For example, such a keyword query may provide search results that include programs that use the APPLE ISIGHT, a camera sensor on a robot, or an application to modify FACEBOOK profile pictures. Neither of these results are particular relevant to what the developer wishes to obtain. In addition, other keywords that would be close enough to provide informative results would be missed. For example, a mashup that finds Ford cars between $10,000 and $20,000 would be useful to this developer since the code finds a price range for a consumer product, but the above keyword search would not return such a result. Accordingly, the systems and methods in this specification can function to modify an indexing scheme for programming related search results to enable provision of improved search results that meet the needs of developer's searching for code.

If the source code were indexed according to a behavior associated with the code and the programmer were to provide example specification data (e.g., example input and output data), the server 102 can function to find search results that better match the developer's request.

Continuing with the example to "find a web mashup to find Canon cameras on EBAY, AMAZON, and GOOGLE PRODUCT SEARCH that are priced between $100 and $500," the developer can specify desired program behavior by illustrating one or more inputs and one or more outputs, and the server 102 can efficiently return search results containing source code that match the desired functionality. Here, the developer can identify specifications that include one or more websites that they wish to search. The search engine architecture 100 in FIG. 1, for example can fetch relevant RSS feeds for the websites and request that the developer remove unwanted items from the feed to create a unified final list, which can be used to form an output specification. Given such specifications and known source code from repository 114, for example (which were both automatically encoded as constraints), the architecture 100 can employ an SMT solver to provide search results by identifying which source code in the repository satisfies the specifications.

In a specific example, an input may include a URL. The server 102 can gather an RSS feed, to form the input that is received by the encoder 108. The output may be a revised set of items from the RSS feed. The output is also sent to the encoder 108. The next step is to send this encoded input-output to the solver module 110.

In the event that the search query does not return any matching search results, the architecture 100 may determine that the search criterion is too strict. As such, architecture 100 can attempt to generate a more generic version of the source code, for example, by opening up the camera brand to any camera brand and/or any price range. This can result in finding source code that may be functionally equivalent.

The system 100 also includes a composition module 146. The composition module can combine together multiple pieces of source code to create a desired behavior that would match a particular input-output specification. As an example, the server 102 can provide two reasonably approximate sets of source code that may be cleverly combined to meet the developer's specifications. In this case, the server 102 may be able to find source code that can take in any brand of camera as input within a price range and a then additionally find a source code that handles just filters for Canon cameras. Stitching such source code together may generate a search result as a solution that would resolve the original search query. This functionality can be implemented in system 100 using SMT solvers, approximation constraints, and indexing techniques.

In some implementations, a number of preliminary steps can be performed by system 100 before a user submits specifications. For example, the encoder module 108 and/or indexer 112 can function to encode programs (source code) into constraints before the source code is made accessible to a user of system 100. The encoding generally involves mapping a programming language onto constraints that can be solved at a later time by an SMT solver, for example. The mapping process can employ symbolic analysis for each particular programming language to determine the constraint representation of the source code. Although the constraint representation of the source code is used in system 100, the user of system 100 generally receives the actual source code as a search result.

In general, the encoder module 108 over-approximates source code behavior, but also attempts to retain enough precision to produce adequate search results using solver module 110. However, over-approximating behavior and encoding problems for which theories do not exist can lead to longer runtimes on the solver module 110. In such instances, simply adding a timeout may make the search more efficient, but it may be incomplete as matching programs could be missed.

In some examples, the users of system 100 can provide multiple specifications, rather than a single specification, to more accurately describe the type of source code desired. For example, if the user knows that a particular algorithm is most often used for a particular language or processor, the user can provide a portion of the algorithm. In some implementations, users can provide multiple specifications in an iterative manner to begin to narrow search results manually. For example, if a first specification entered as a search query returns 2,000 hits, the user may wish to further refine the search query by adding additional specification requirements. The additional specification requirements can include additional data as input and/or output. In some implementations, the system 100 can automatically apply received specifications in an incremental fashion in order to narrow search results.

FIGS. 2A-2B are conceptual diagrams showing an example of mapping source documents to constraints. The examples in FIGS. 2A and 2B pertain to the YAHOO! PIPES web application that provides graphical user interfaces for building data mashups and aggregating web feeds, web pages, and other services and creating web-based applications from various sources. FIG. 2A shows a representation of an example program. FIG. 2B shows an example set of constraints.

In short, a program, such as program 200, can be used to encode and solve a pipe "P" given a lightweight specification "LS". The pipe "P" represents an example program and the lightweight specification "LS" may be represented by an input-output pair. Initially, the pipe "P" is refactored for size and simplicity using components of server 102 to reduce the number of modules that will be encoded. Input and output information (i.e., URLs) can then be abstracted out of the pipe such that constraints can be solved for any arbitrary specification "LS". Next, each module and wire in the pipe is systematically mapped onto constraints (e.g., Encode P→Cp) and an SMT solver evaluates the mapped constraints (e.g., Solve(Cp^LS)).

Referring to FIG. 2A, program 200 represents an example YAHOO! PIPES program. The program 200 includes a single pipe with four steps. The mapping performed in the program 200 employs a fetch component 202a that provides a list of records to the program 200 for a particular URL, a filter component 204a that removes records based on some criteria "c", a truncate component 206a which performs a "head" operation on the list given a length "n", and an output component 208a provides the sink of the program 200.

Referring to FIG. 2B, example constraints corresponding to the modules and steps in FIG. 2A are shown. In general, the constraints used in the encoding steps for the YAHOO! PIPES examples in this document include at least three types of constraints for components that manipulate a list of items (e.g., RSS feeds, URLs). The constraint types include inclusion, exclusion, and order. Other constraints that can be used include constraints on components that act as generators of lists (e.g., fetch a URL), a final output component, links between components, and/or equality constraints. Inclusion constraints ensure completeness and in general, all relevant items from the input can exist in the output. Exclusion constraints ensure precision. Order constraints ensure that the list of items are ordered properly. The links described along with these examples can be represented as equality constraints on the output and input of the connected components, for example.

In this example, the mapping of items and or code to constraints includes abstracting the input and the output from a pipe, and then symbolically analyzing the program to generate constraints representing the program semantics. Abstracting the input and output can include removing all URL information so that the program can be solved for any given URL. This is depicted in FIG. 2B at line 202b where "out1=input". The original "input" pertains to a concrete URL, but after abstraction, the "input" represents a symbol assigned to "input" for some "(input,output)∈LS)". The output from the specification is mapped to the output from the program, which is depicted "output=in4". The remainder of the constraints in FIG. 2B represent the semantics of the program itself. At line 202c, the connections between 202a and 204a is represented with an equality constraint is shown where "link(1,2)" is encoded as "in2=out1". Such notation implies that the input to the second module filter 204a is the same as the output from the first module fetch 202a.

Lines 204c through 208b illustrate further constraint mapping that can be performed to map program constructs (e.g., 204a, 206a) to constraints. Although the pipe in FIG. 2A illustrates only four modules, additional modules can be used. For example, additional modules can include permutation modules, merge modules, generate modules, copy modules, head/tail operations performed on lists of records, where a record is a data type with fields that contain values. For example, a title field may contain the title of a webpage.

Encoding typically occurs within the encoder module 108 and involves symbolic analysis of programs in repository 114 to produce constraints that represent those programs to be stored in repository 116. Once the encoding process is completed, the constraint system can be solved using a constraint solver, such as an SMT solver (e.g., "Z3", "CVC3", "Yices," and/or Choco. Constraints can represent an innumerable space of program semantics. For example, constraints can be encoded for list and/or array manipulation (e.g., sorting, head and tail, insertion, deletion, size, copy, concatenate, reverse, distinct, etc.). Constraints can also be encoded for string processing (e.g., equality, substring, less than comparisons, length, concatenation, reverse, etc.). Constraints can additionally be encoded for integer arithmetic (e.g., addition, subtraction, equality, less than/more than comparisons, etc.). Other constraints may represent control flow in a program, such as loops and predicates, or data structures such as objects in the heap. Such constraints can represent a broad range of common programming tasks in many programming languages, such as SQL, JAVA, C# and C++, LUSTRE for control systems, UNIX commands that can use a pipe operator, and other languages with similar semantics to those listed.

Figure 3:
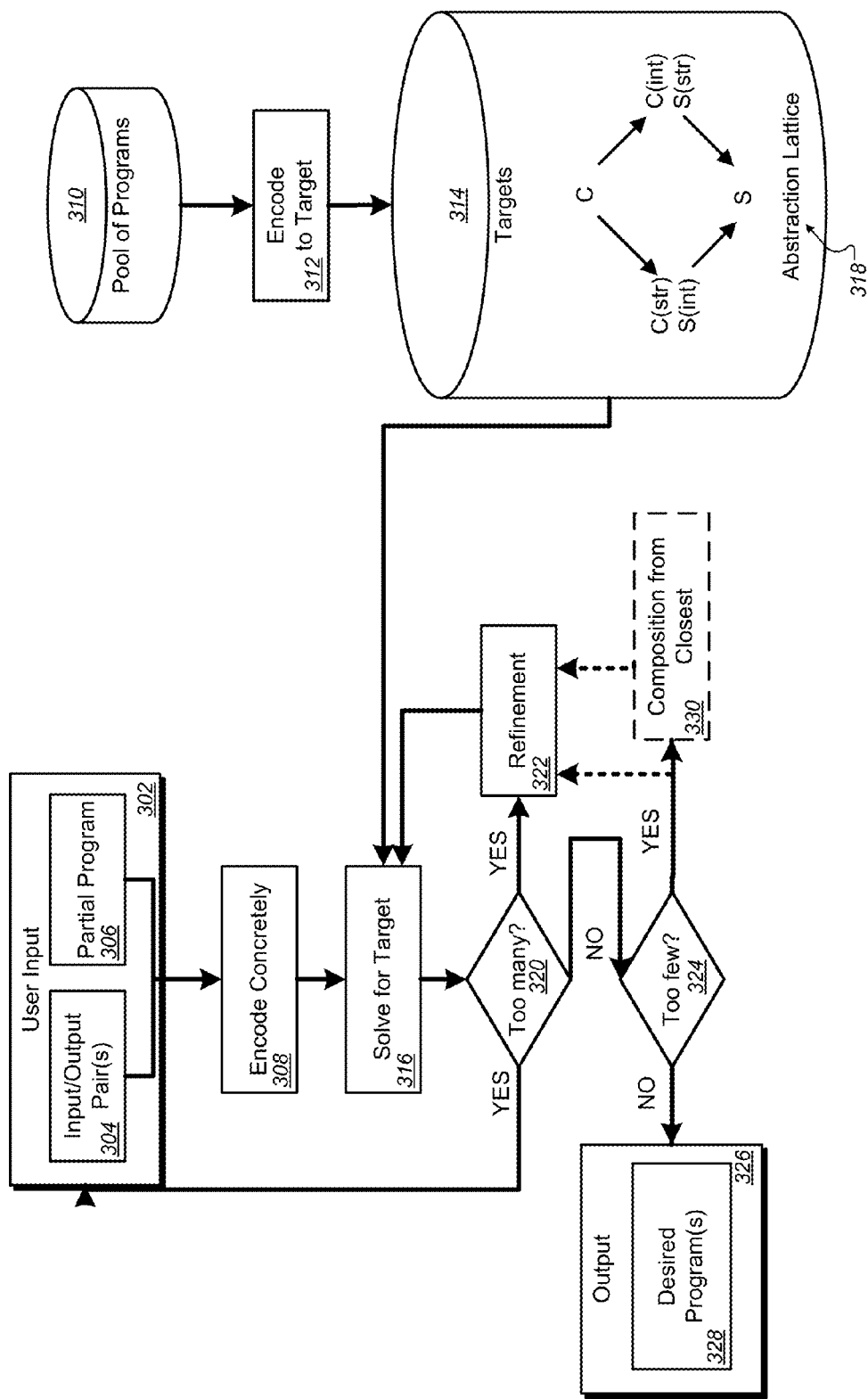
FIG. 3 is a conceptual diagram showing an example of refining specifications.

FIG. 3 is a conceptual diagram 300 showing an example of refining specifications. The diagram 300 illustrates activities such as defining specifications, encoding a repository of programs, identifying matching source code/programs, refining constraints, and composing programs.

At step 302, user input is received. Instead of or in addition to a typical search query that includes textual queries, the user input in this example may include lightweight, incomplete specifications that characterize desired behavior for particular source code. These specifications can be in the form of input-output pair(s) 304 (e.g., two unsorted lists and a combined sorted list) and/or partial program fragments 306 (e.g., a sort component). In some examples, the size of the specifications define, in part, the strength of the specifications, and this approach may allow a developer to provide specifications incrementally.

At step 308, a repository of programs is encoded. In some implementations, the encoding is performed in an offline state. For example, a pool of programs 310 is mapped to particular constraints by encoding 312 to particular targets within the programs 310. In other implementations, the encoding is performed on the fly as new programs are received. The encoding of programs includes mapping the programs into constraints (i.e., a target). The encoded programs can be stored in repository 314.

The level of granularity for encoding can be selected to attain a balance between the cost of a search and the precision of matches. That is, a level too fine could result in constraint systems that cannot be resolved efficiently and a level too coarse could return too many matches. To permit exact or close enough matches to be identified, the constraints may be encoded at various levels of abstraction. In a YAHOO! PIPES example, the programs are encoded at the component level, which maps each component onto constraints. Since YAHOO! PIPES is a dataflow language, constraints are classified in terms of inclusion, exclusion, and order. Inclusion ensures completeness where all relevant records from the input exist in the output. Exclusion ensures precision where all records in the output are relevant. Order ensures that the records are ordered properly, as is typical when asserting constraints over lists.

At step 316, matching programs from database 314 are identified. For example, an SMT solver solves for a target by determining which, if any, match the specifications received as user input 302. The solving may be performed in an iterative fashion. For example, in a first iteration, a search can be performed to find an exact match, which corresponds to a concrete encoding (e.g., "C" shown in abstraction lattice 318).

In the event that the received specifications or the encoded program constraints are weak, many matches may be returned. If instead, the received specifications are too strong, the server 102 may not yield any results. To address these scenarios, specification and code encoding refinements can be performed. In particular, at step 320, it may be determined that there are too many matches. If it is determined that there are too many matches, a developer can refine or extend the specifications by providing additional input/output pairs or other lightweight specifications 302. In some implementations, the solver can be used to guide the programmer in creating additional specifications. Alternatively, if it is determine that there are too many matches, a refinement process 322 can be performed to strengthen the constraints representing the source code (e.g., moving up the abstraction lattice 318) and the solving for target step 316 can be performed using the abstracted constraints.

If instead, at step 324, it is determined that there are too few matches, the target outputs used by the server 102 may be too strict and as such, alternative matching criteria or an alternative composition of programs from a closest match may be warranted. In some implementations, the system 102 may consider using a subset of the input/output pairs to identify a close enough match. In some implementations, the system 102 uses the abstraction selector 144 to change the abstraction level of the source code being used by the solver 110. In some implementations, a composition model 146 is used to compose together multiple pieces of source code.

In the event that there are not too many matches 320 nor are there too few matches 324, a finalized output 326 can be returned to the programmer, where the output 326 includes one or more search results in the form of programs 328 that match the user-provided specification. The programs 328 can be provided to the user.

In some implementations, the server 102 can change program encodings. For example, stronger constraints utilize concrete values and identify exact matches, while weaker constraints utilize symbolic values (e.g., "S" in the abstraction lattice 318). As an example, constraints are generally defined using two data types that can hold concrete or symbolic values. Such data types include integer data type (e.g., int) and string data type (e.g., stn. In the example abstraction lattice 318, either the integers (e.g., C(str) S(int)) or the strings (e.g., C(int) S(str)) can be relaxed. Alternatively, both the integers and the strings can be relaxed.

In some implementations, multiple constraints can be relaxed using lattices to relax matching criteria. The relax activity can include exploiting the fact that most programming languages contain constraints over multiple data types (e.g., strings, floats, integers, Booleans, lists, etc.) and so the relaxation can be performed by treating some or all variables of a certain type as symbolic data and performing matches across the symbolic data. In addition, using lattices to relax matching criteria can include leveraging domain specific language properties, such as order constraints in list or table processing languages.

In the event that no target or match can be determined by the steps in diagram 300, programs can be combined to provide a closest match that includes a composition of the closest matches 330. That is, if no single program matches the input specifications 302, there may be a composition of multiple programs that can provide the user with useful information. As such, the systems described in this specification can compare potential candidate programs in terms of how close the programs match the received specification and accordingly, compose sequences of searches so that the state of each program can be captured and used as a starting point for any subsequent searching. For example, in the context of a YAHOO! PIPES example, semantic search capabilities may be able to return one pipe that obtains, sorts, and filters data. The outcome of such a pipe may not meet a developer's specific specifications; however, the output of this pipe fed into another pipe that further applies location module functionality, for example, may meet the developer's specific specifications.

In another example of providing a composition of programs, a developer may wish to find source code (e.g., programs) that formats population information in different colors at the state level and provides a list of sort population information. As such, a search can be performed using developer-entered specification data that includes, for example, US population metrics, states with large a large population, and an alphabetic list of states. The system 100 can attempt to find a closest program match can be selected. The closest program match may be defined, for example, in terms of the number of broken constraints (i.e., closer matches differ by fewer broken constraints). Next, it can be determined whether or not the output, provided as an input to another program, achieves the specified output of formatting population information in different colors at the state level near a list of sorted population information. Namely, it is determined whether a conjunction of two programs "P" and "Q" that match the specified input-output pair. For example, a program "P" may extract and format population information for each state, but may provide the list in an unsorted fashion. A program "Q" may sort data. The composition of "P" and "Q" would create a pipe (in YAHOO! PIPES) "PQ" with the desired behavior. In another example, a program "P" in Java could extract the alias from an e-mail address, and a program "Q" could determine the length of a string. Stitching "P" and "Q" together would create a program "PQ" that, given an e-mail address, returns the length of the alias.

Figure 4:
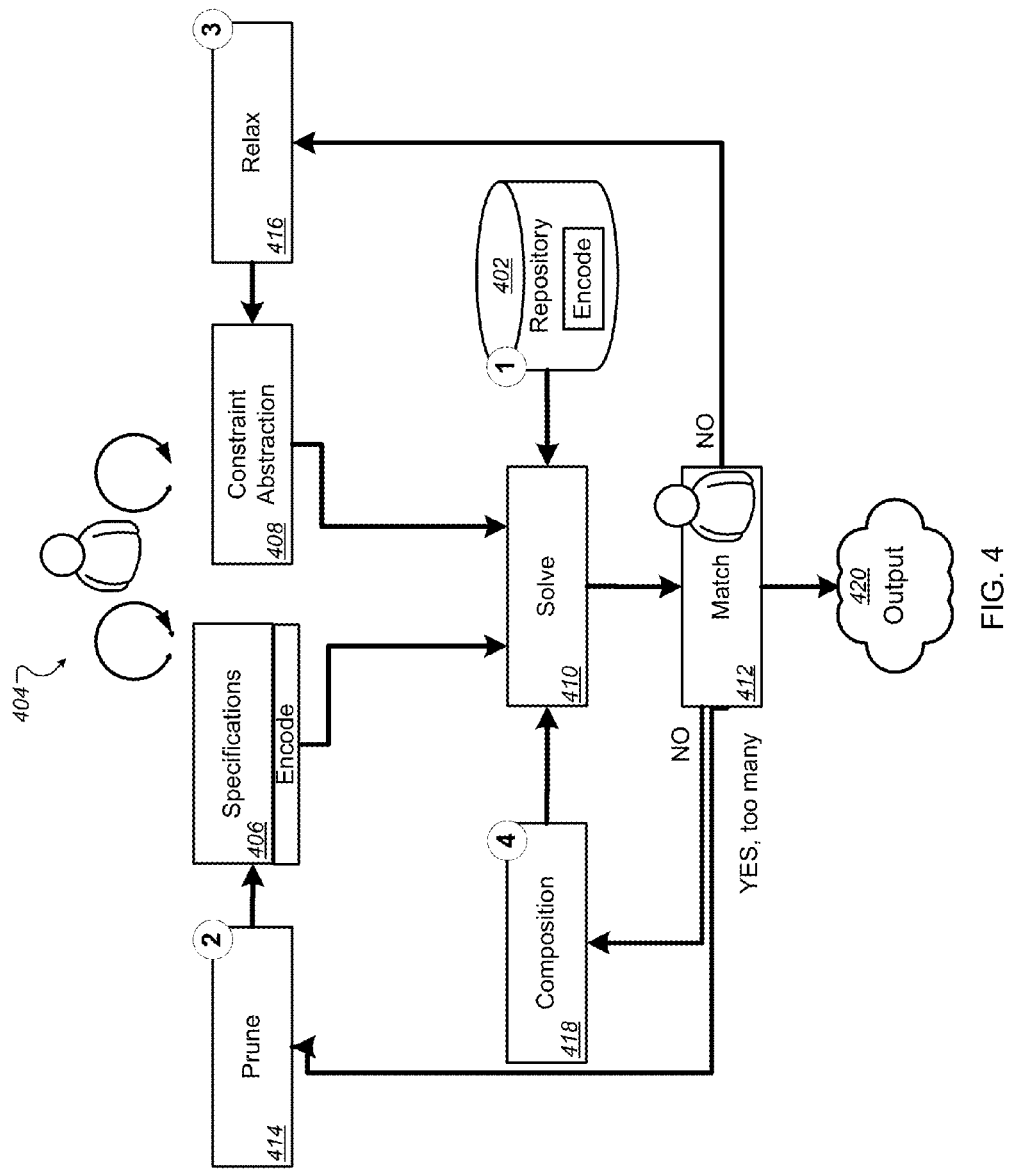
FIG. 4 is flow chart of a process for identifying source code according to received specifications.

FIG. 4 is flow chart of a process 400 for identifying source code according to received specifications. Using process 400, programmers can search for relevant code in a repository, such as repository 402. Process 400 enables a developer of software programs to conduct an incremental and flexible search using partial specifications, such as integers, code behavior, algorithm requirements, and so on. Process 400 can employ a constraint solver to identify which particular programs provide a match associated with the developer-entered specifications.

One form of specification can include an input-output pair that corresponds to desired code functionality. The form of the specification may be modified depending on which programming domain is used. For example, in the YAHOO! PIPES language, the specification may take the form of URLs for RSS feeds as input and the desired content from the feeds may be the output. In SQL, the specification may take the form of a populated database as input and the desired table or records as output. In Java or similar languages, the specification may take the form of integers, characters, Booleans, strings, tables, lists, or other datatypes and objects. An input in a specification can include multiple entities, as can an output. As an example, an input could include two integers, 4 and 2, and an output 16, where the desired program takes the first integer to the power of the second (i.e., $4^2$=16). As another example, an input could be an array of Strings, ["a", "b", "c"], and the output could be two strings, "a" and "c", where the desired source code would return the first and last elements of the array.

In short, process 400 illustrates building blocks to 1) map and encode a repository of programs and user specifications so that a constraint solver can identify a match, 2) in the case that the specifications are too weak, the search space can be pruned to identify which matches may be relevant or if the specifications are too strong, 3) in the case that the specifications are too strong, abstraction on the constraints may be applied to find approximate matches, and 4) in the event that no single program matches the specification, multiple programs can be composed together to achieve desired code behavior.

In operation, a user 404 provides specifications 406 that are automatically encoded into constraints. The encoded specifications can use constraint abstraction 408 to identify/solve 410 for matches 412 in the repository of encoded programs 402. The identification process may employ a constraint solver. The incremental aspect of the above-described approach can allow the user to prune 414 the set of potential matches if the specifications provided are too weak. In some implementations, the process 400 may include systematically relaxing 416 particular constraints to find approximate solutions when the specifications are too strong. A search can be further extended through composition processes 418. The composition processes 418 may include enabling infrastructure operating process 400 to compose together existing programs or source code from repository 402 or another repository to obtain desired program behavior output 420.

Figure 5:
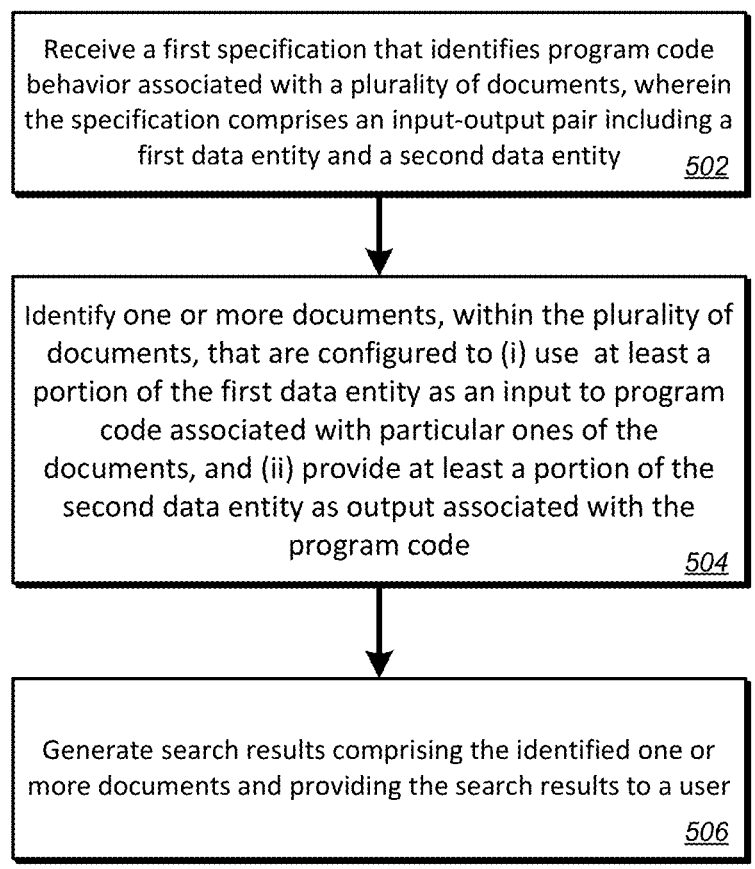
FIG. 5 is a flow chart of a process for providing search results according to received specifications.

FIG. 5 is a flow chart of a process 500 for providing search results according to received specifications. The process 500 is described in reference to FIG. 1, but the architecture in FIG. 1 represents one example implementation, and as such, other systems can be utilized. In general, the process 500 generates search results associated with user-entered specification data. The process 500 can begin by receiving (502) a first specification that identifies program code behavior associated with a plurality of documents. For example, the server 102 (FIG. 1) can receive specifications 138 that includes a list of URLs and a list of information associated with the list of URLs. The specifications 138 may be represented as an input-output pair that includes a first data entity (e.g., an input that includes websites) and a second data entity (e.g., an output that includes RSS feed listings associated with the websites and/or specification). For example, the input may represent EBAY, AMAZON, and GOOGLE PRODUCT SEARCH while the output represents a listing of cameras for sale that are priced under $300. In another example, the first data entity may be a file and the second data entity may be a linked list in which nodes in the linked list include the content in the file and one or more additional rows of data. In some implementations, the first data entity includes an input of a first file type and the second data entity includes an output of a second file type. For example, the first data entity may be an eXtensible Markup Language (XML) file type and the second data entity may be a Structured Query Language (SQL) file type. In another example, the first data entity may be a string data type and the second data entity may be a Boolean data type. In yet another example, the first data entity may include RSS feeds and the second data entity may include a subset of the RSS feeds that match the specification. In another example, the first data entity may be a file while the second data entity is an integer. In some implementations, additional specifications can be received and the system 100 can refine search results based on the additional specifications and generate and provide refined search results to a user.

Upon receiving the specifications 138, the server 102 can identify (504) one or more documents, within the plurality of documents that are configured to (i) use at least a portion of the first data entity as an input to program code associated with particular ones of the documents, and (ii) provide at least a portion of the second data entity as output associated with the program code. The particular ones of the documents may correspond to a positive matching between one or more constraints associated with each document and one or more constraints associated with the specification. For example, the server 102 can identify code candidates 140 that take the first data entity as an input and provide the second data entity as output. The server 102 can then generate (506) search results comprising the identified one or more documents and provide the search results to a user. For example, the server 102 can identify existing code candidates 140 that include source code that will take in shopping websites, and generate possible product results within the price guideline of $300. As another example, the server 102 can identify existing code candidates 140 that include source code that will take as input a string and return as output the number of times the letter "a" appears in that string.

In some implementations, additional specifications can be received and the server 102 can refine search results for the user based at least in part on the additional specifications. The refined search results can be provided to the user. In some implementations, the method 500 can include automatically encoding each of the plurality of documents into a set of constraints using symbolic analysis on program source code. The symbolic analysis would then produce a characterization of the potential behaviors associated with a piece of source code.

Although the various actions in this figure have been shown in a linear grouping as one example, the particular determinations made in the process and the order of those determinations may vary depending on the implementation.

Figure 6:
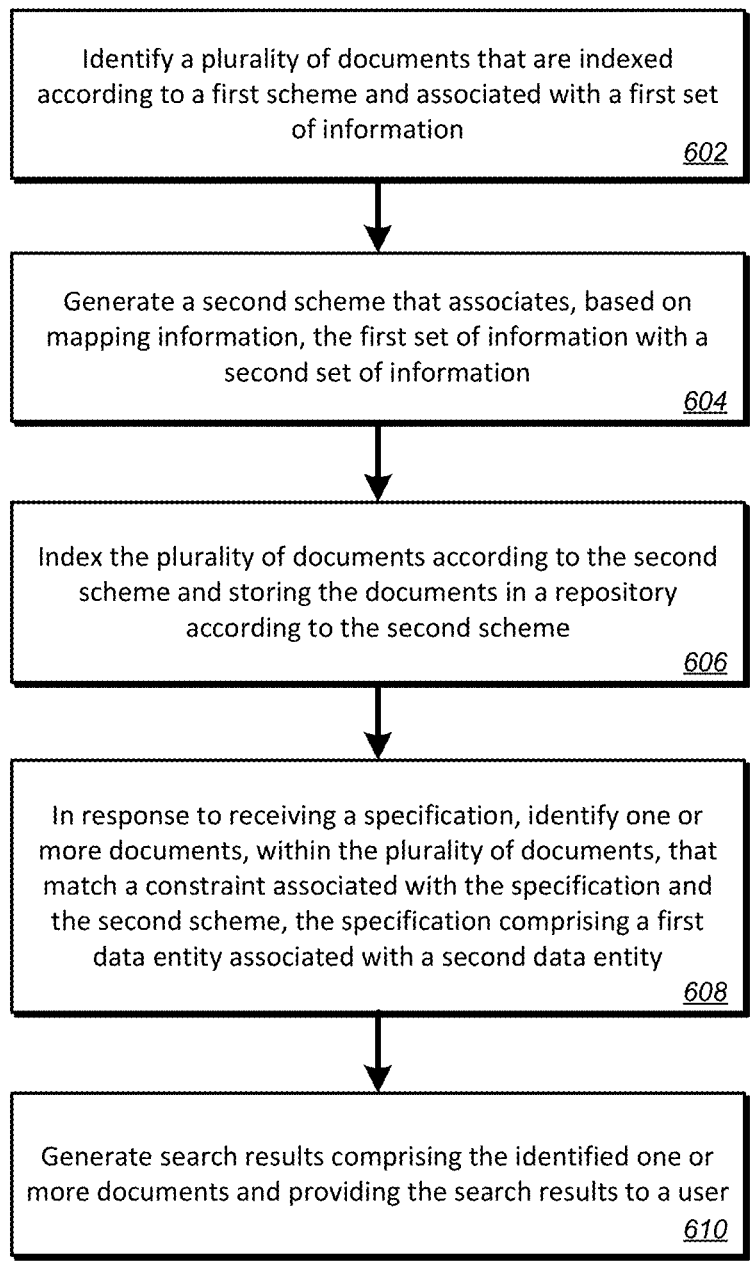
FIG. 6 is a flow chart of a process for providing search results indexed according to a modified scheme.

FIG. 6 is a flow chart of a process 600 for providing search results indexed according to a modified scheme. The process 600 is described in reference to FIG. 1, but the architecture in FIG. 1 represents one example implementation, and as such, other systems can be utilized. In general, the process 600 generates search results associated with user-entered specification data. The process 600 can begin by identifying (602) a plurality of documents that are indexed according to a first scheme and associated with a first set of information. That is, the server 102 can identify a code repository 114 that is associated with a set of constraints and indexed according to a scheme that takes into account semantic information for particular source code in the repository 114.

From the first scheme, the server 102 can generate (604) a second scheme for the code in the code repository 114, for example, that associates the first set of information with a second set of information. The first set of information may pertain to keywords in the code and the second set of information may pertain to a behavior or function carried out by the code, for example. In some implementations, the first scheme represents a textual representation of particular source code, while the second scheme represents constraints that describe the semantics of the source code itself. The association can be based on mapping information that automatically associate code stored in code repository 114 with particular constraints. For example, the constraints may be generated by system 100 and applied to the code. In some implementations, the second scheme is not associated or generated from the first scheme, but is instead generated independent of the first scheme.

Next, the server 102 can index (606) the plurality of documents according to the second scheme and storing the documents in a repository according to the second scheme. For example, the server 102 can index code according to the generated second scheme pertaining to behavior or function carried out by the code. The newly indexed code can be stored in code repository 114 according to the second index scheme.

In some implementations, the first scheme may be adapted to index documents according to a plurality of keywords associated with the one or more documents. In addition, the second scheme may be adapted to index documents using an information hierarchy with a plurality of specifications, document indices, and lexicons for classifying details associated with an intended function of source code in the one or more documents. Other implementations and scheme implementations are possible.

In response to receiving a specification from a user, for example, the server 102 can identify (608) one or more documents (e.g., source code), within the plurality of documents, that match a constraint associated with the specification and the second scheme. For example, the system 100 can attempt to match a known constraint for a user-entered specification to source code by matching the semantic meaning of the user-entered specification to information identified by the second scheme. The user-entered specification information can include a first data entity (e.g., a program input) that is associated with a second data entity (e.g., a program output). The server 102 can then generate (610) search results that include the identified one or more documents and provide the search results to a user. In some implementations, the first data entity is a file and the second data entity is a linked list.

In some implementations, identifying the one or more documents that match the constraint associated with the specification includes using a Satisfiability Modulo Theory (SMT) solver to iteratively determine matches between the one or more documents and the constraint associated with the specification. In some implementations, identifying the one or more documents that match the constraint associated with the specification includes determining whether using the first data entity as an input argument in executable code associated with particular ones of the documents results in an output argument represented within the second data entity.

In some implementations, the process 600 can include relaxing matching criteria associated with the constraint and using an SMT solver and the relaxed matching criteria to identify one or more additional documents. In addition, the server 102 can generate additional search results that identify more documents that match the relaxed matching criteria and provide the additional search results to a user. Such search results may represent documents that do not exactly match the given constraints, but instead approximately match the given constraints.

Although the various actions in this figure have been shown in a linear grouping as one example, the particular determinations made in the process and the order of those determinations may vary depending on the implementation.

Figure 7:
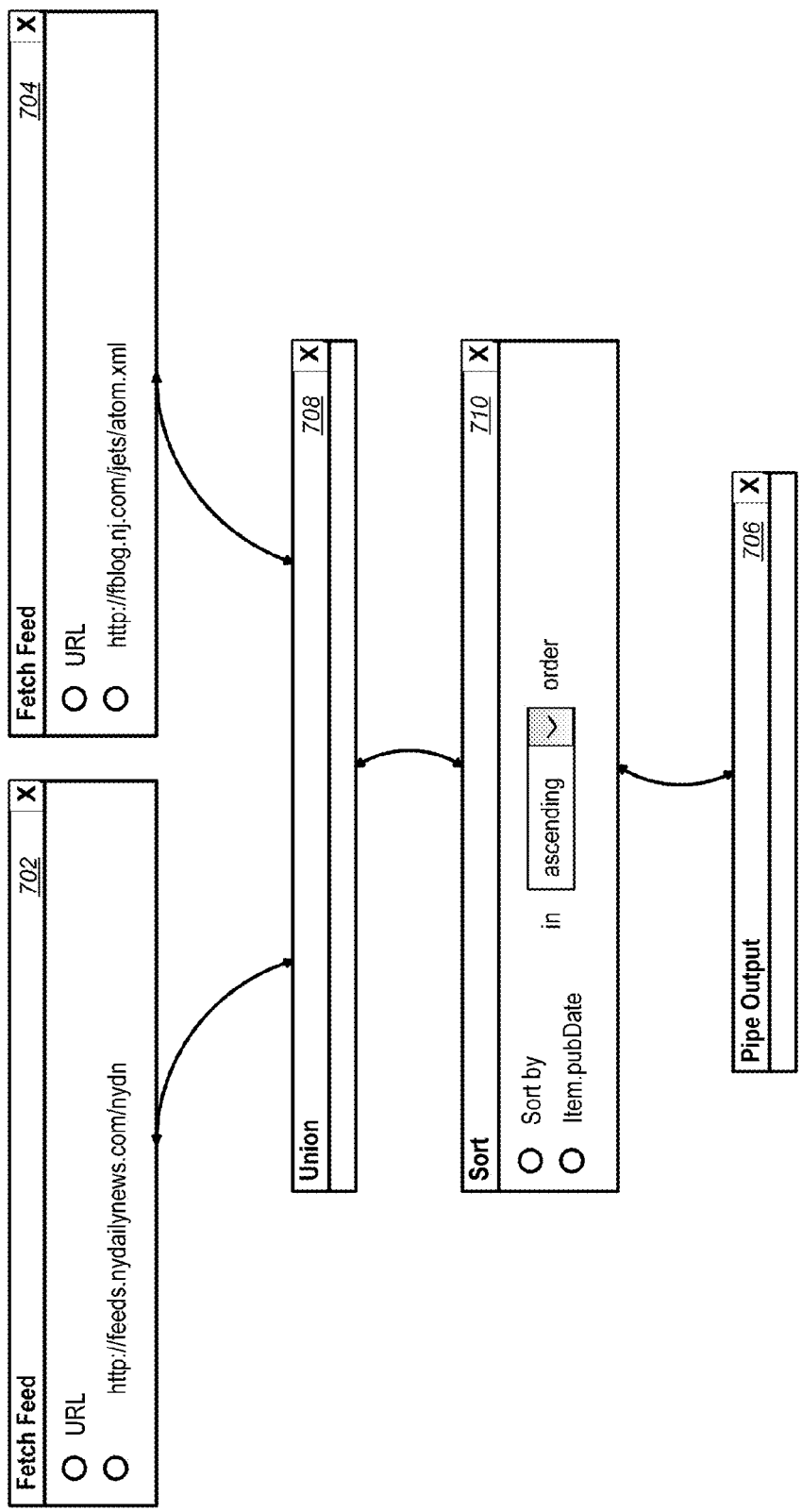
FIG. 7 is a block diagram showing an example of providing a unified output from multiple data sources.

FIG. 7 is a block diagram showing an example of providing a unified output from multiple data sources. This example includes the domain of web mashups using the YAHOO! PIPES language which allows users to generate mashups within a browser. The YAHOO! PIPES language is a component-based dataflow language that can access multiple data sources (e.g., RSS feeds), manipulate the data (e.g., filter, sort, concatenate), and create a unified output. This particular example matches a user-entered specification for ordering articles from two separate blogs according to publication date.

Inputs to the programs shown in this example are typically data sources that include RSS feeds, such as those referenced by fetch feed 702 and fetch feed 704. The output is a list of records that result when using the RSS feeds as input, as shown by pipe output 706. Fetch feed 702 pertains to a New York Daily News blog associated with a particular URL. Fetch feed 704 pertains to a New Jersey blog associated with another URL.

Both RSS feeds and associated URLs 702 and 704 can be provided as inputs in a specification. An output is derived from the input(s) to form the specification. The server system 102 can receive the specifications and determine source code that may be relevant. In this example, the server 102 can perform a union to concatenate lists from one or more lists identified by the input-output pair. Sorting can be performed according to publication data as shown by sort pipe 710.

FIGS. 8A-8E illustrate example representations of pipes used to derive input and output lightweight specifications used to find source code. For convenience, the examples are described in reference to modules illustrated in FIG. 1 of this disclosure. As such, other modules or fewer or additional modules can be used. Each example includes five operations, but fewer or greater can be used. For each example pipes "P," (represented by structures 800, 820, 832, 842, and 852 in FIGS. 8A-8E) the server 102, for example, can analyze a lightweight specification "LS" by extracting the URLs from "P," using a solving time of "T: URLs→i" to generate an input "i". In addition, the server 102 can then execute the pipe "P" and set the output to "o". To capture the behavior of the pipes while keeping the solving time reasonable, "T" can be limited to the number of records from each URL (e.g., "T" can be limited to 5). That is, output "o" can be modified based on a number of records retained in input "i". In general, the following examples determine search results using structure, behavior and the specification equation "LS={(i,o)}" for each example pipe "P".

FIG. 8A corresponds to finding source code that selects all records that show current weather conditions or a 10-day forecast for Malibu, Exeter, or Camarillo. An example structure 800 shows a representation of pipe "P1" and a lightweight specification "LS1". In the structure 800, the server 102 performs a fetch operation 802 that retrieves RSS feeds as input. In addition, the server 102 performs a split operation 804 that makes a copy of the retrieved RSS feeds. The server 102 can then send one copy of the RSS feeds along each output wire, as shown by arrows 806 and 808. Each respective filter 810 and 812 identifies a different substring to use as a search query. For example, filter 810 can perform a query based on a substring "10-day" related to forecasts. Similarly, filter 812 can perform a query based on a substring "Current" related to weather patterns. Each query can generate a list of possible results. Next, a union operation 814 concatenates the lists generated by the filter operations 810 and 812. The lightweight specification "LS1={i,o)}" can be labeled as specific input and output 816. For example, each box labeled "$X_j$" represents a distinct record at index j in an input list. In this example, there are ten records in the input list determined from two separate URLs (e.g., "i[0 . . . 4]" from URL1 and "i[5 . . . 9]" from URL2). In the output, two records, "$X_0$=i[0]" and "$X_5$=i[5]" are retained. The order of the records in the output 816 is illustrated, as shown in FIG. 8A. In this example "o[0]=$X_0$" and "o[1]=$X_5$".

FIG. 8B corresponds to finding source code that selects the four most recent records from a list that contain information about a hotel. An example structure 820 shows a representation of pipe "P2" and a lightweight specification "LS2". In the structure 820, the server 102 performs a fetch operation 822 that retrieves RSS feeds as input. In addition, the server 102 performs a filter operation 824 that looks for the term "hotel" as a substring in each record description field. Next, the server 102 performs a sort operation 826 based on the records' publication dates and also performs a truncate operation 828 to permit only three records, as indicated by the lightweight specification "LS2". In the lightweight specification, there are ten records in the input from two URLs (i.e., k[0 . . . 4] are from URL1 and i[5 . . . 9] are from URL2). The output has three records, but the order of the records in the output is different from that in the input (i.e., o={i[9], i[1], and i[2]]).

Figure 8C:
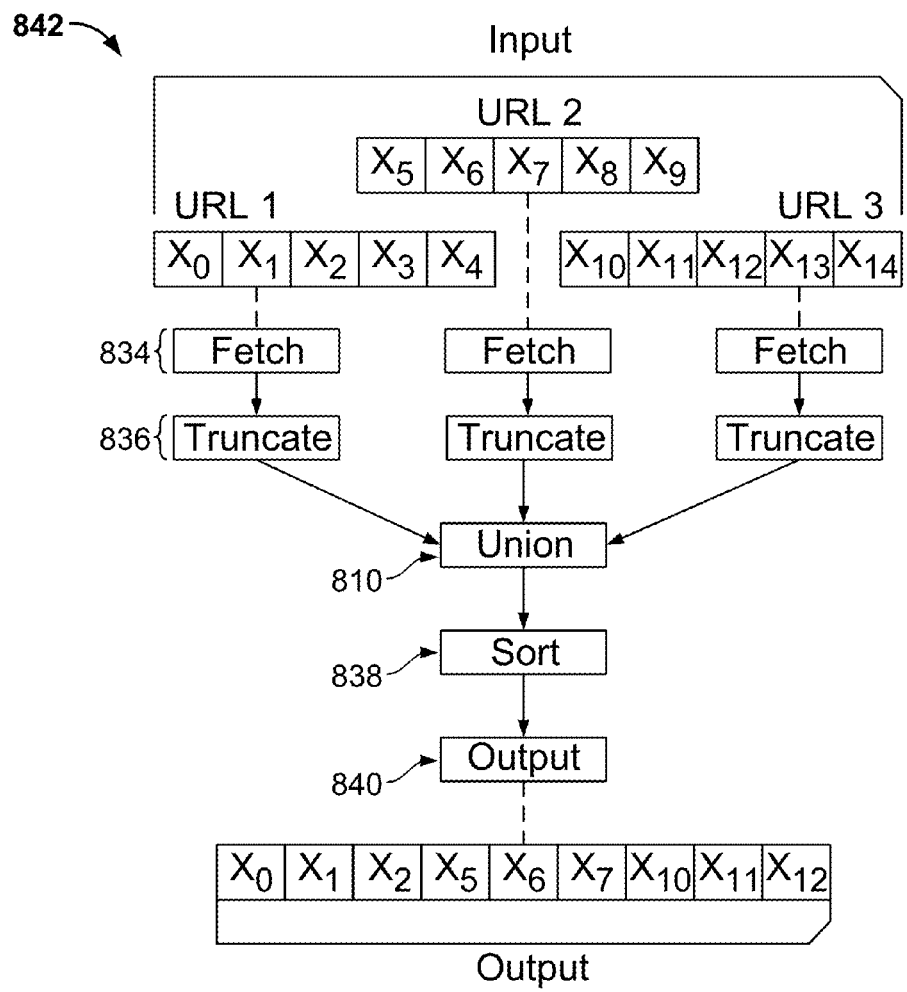

FIG. 8C corresponds to finding source code that selects the first three records from each source, where the sources are indicated using different background colors. An example structure 832 shows a representation of pipe "P3" and a lightweight specification "LS3". As described above, one or more fetch operations 834 can be performed based on particular URLs and one or more truncate operations 836 can be performed, accordingly. Next, the server 102 can perform a sort operation that is based on publication date and each truncate operation 836 permits three records. This example includes three URLs with one assigned to each input path during the fetch operations 834. Next, the server 102 can perform a union operation 838 to merge together the set of three records from each URL. The lightweight specification includes 15 records in the input and 9 records in the output 842, where the output is represented by the first three records from each URL.

Figure 8E:
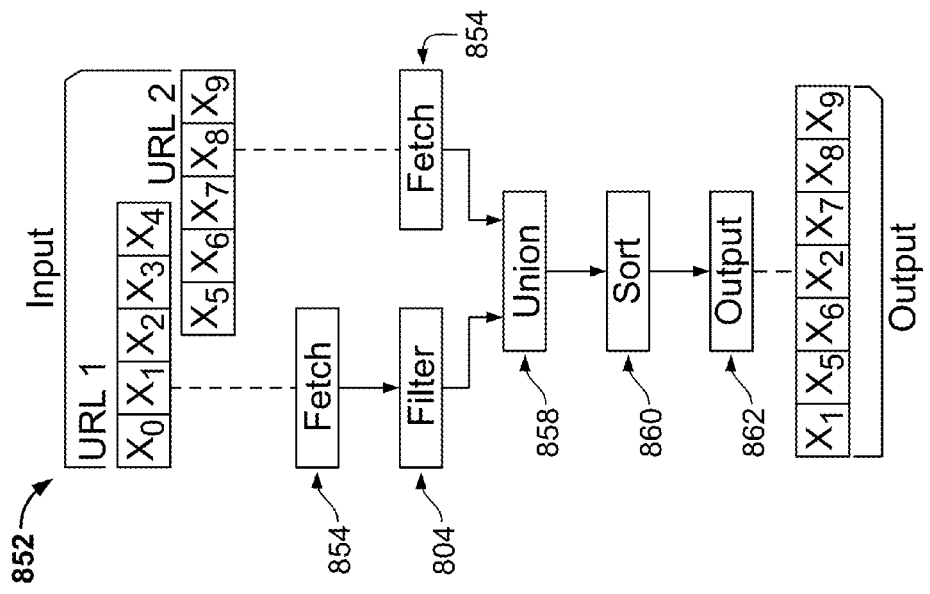
Figure 8D:
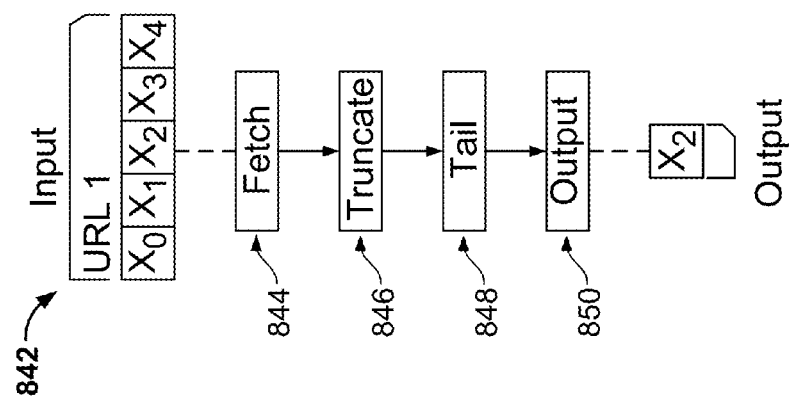

FIG. 8D corresponds to finding source code that selects the third most recent record from the list. An example structure 842 shows a representation of pipe "P4" and a lightweight specification "LS4". As described above, one or more fetch operations 844 can be performed based on particular URLs. Next, the server 102 can perform a truncate operation 846 and a tail operation 848 which may be head and tail operations, respectively, which are performed on the input list to identify a third record. This example includes one URL and the lightweight specification shows just one record "$X_2$" in the output 850.

FIG. 8E corresponds to finding source code that selects all records with a pink background, and those items from a grey background with "au" in the description. An example structure 852 shows a representation of pipe "P5" and a lightweight specification "LS5". As described above, one or more fetch operations 854 can be performed based on particular URLs. Next, the server 102 can perform a filter operation 856 that looks for the substring "au" in a description field. Next, the fetched and/or filtered content can be merged in a union operation 858. The server 102 can then perform a sort operation 860 to sort based on the publication date. This example includes two URLs. The input includes 10 records and the output 862 includes 7 records.

FIGS. 9A-9B represent conceptual diagrams showing an example implementation of input and output specifications in the YAHOO! PIPES domain. In the example described below, a programmer may provide URLs for RSS feed(s) as input. The system 100, for example, can fetch the RSS feeds and produce an input list. The programmer can then modify this list by reordering, removing, or modifying items to form an output list.

Example

YAHOO! PIPES

Referring to FIG. 9A, a programmer can provide a URL 902. The system 100 can retrieve a number of related RSS feeds. In this example, the system 100 retrieved "n" items (e.g., items 904, 906, 908, 910, and 912). As shown, the programmer has selected "Item 3" 908 as an example of the desired output. The system 100 can use this selection and form an output list of size one. In the YAHOO! PIPES domain, the programmer can specify the behavior of an entire program, and so entire programs are generally encoded as constraints and returned by a search query. When a pipe is encoded, the URL information is abstracted away so the pipe can be solved for any URL provided as input. This abstraction occurs so that the programmer can find pipes that behave as desired, given their defined input and output.

The encoding process may include mapping each module to a set of constraints. FIG. 9B illustrates a number of modules mapped to constraints. Each connector (called wires) defines the relationships between the modules. The module constraints can be expressed in terms of the input to and output from the module (e.g., in(Filter), shown by module 914, refers to the list of items that enters the Filter module, and out(Filter) refers to the list of items that exists the Filter module). Constraints "c1" and "c3," shown at Fetch modules 916 and 918, assign input variables to each of the Fetch Feed (succinctly, Fetch) modules. Constraints "c2" and "c4," shown at modules 916 and 918, ensure that the output from the Fetch modules are the same as the input. Constraints "c5" and "c6," shown at modules 920 and 922, connect the output from the Fetch modules to the Union module 924 as inputs. The Union module 924 concatenates its input lists, which is described by constraints "c7a", "c7b" and "c8." The first constraint, "c7a," ensures that all the items at the front of the output list, out(Union) come from the first input list, in(Union1). The second constraint, "c7b", ensures that the next items are from in(Union2). This is called inclusion. The next constraint, "c8", ensures that all items in the output list from the module exist in one of the two input lists, and in this way no extra items are appended to the end of the list. This constraint enforces exclusion. The output from the Union module goes to the Filter module per "c9." Representing the Filter module requires three constraints that enforce inclusion, exclusion, and order properties. The first, "c10," ensures that all items in in(Filter) that contain "tennis" in the description also exist in the out(Filter) list. The exclusion constraint, "c11", ensures that all records in the output are also from the input (i.e., none were added and out(Filter)⊆in(Filter)). The final constraint for this module, "c12", ensures that if two records exist in the output list, their ordering is the same as it was in the input list. In this way, the module is order-preserving. Constraint "c13" 926 ensures that the output from the Filter module goes to the input of the Output module, and "c14" 928 ensures that the output of the pipe, out(Output) is the same as in(Output).

Example

String Manipulations in Java

The following examples describe the use of JAVA program snippets that contain calls to the "java.lang.String" library. In one example, mapping of input/output specifications onto snippets of code is described. In another example, how refinement on the specification impacts search results is described. In yet another example, handling of ambiguity in code snippets is described.

As discussed above, a search query can be performed using example input and expected output pairs. In the context of the Java String library, those inputs and outputs may be one of several data types including, but not limited to integers, characters, strings, Booleans, and other datatypes and objects used in and by a Java program.

In an example implementation of system 100, a programmer may wish to find the length of a file extension (including the punctuation dot "."). The input may be a string while the output is an integer. For example, an input string "foo.txt" can represent the input while the number "4" represents the integer output. In this example, using the input string and integer output in a search query identifies 83 potential matches from a repository with hundreds of encoded programs. The following snippet represents one match that involves four API calls:

(1) int begin=s.lastIndexOf (".");
(2) int end=s.length( )
(3) String ext=s.substring (begin, end);
(4) int len=ext.length( )

Here, the input can be mapped to the only undefined variable in the code snippet "s" (inferred to be of type string). The output can then be mapped to the left hand side of the final assignment statement "len," which, in this example, represents the only unused variable. In some implementations, these bindings are calculated by computing and exploring the definition-use pairs. There may be a number of other potential mappings of an input-output specification to a code snippet.

In another example implementation of system 100, the server 102 can refine the specification. For example, the server 102 can receive a specification that can be used as a query to find code that extracts an alias from an email address. The input can be represented as "susie@mail.com" and the output can be represented as "susie." With this input-output pair encoded as constraints, the system 102 can, for example, perform a search and return 51 matches. In these searches, the specifications may be considered weak, and as such, many of the results may be irrelevant. For example, in the alias extraction example above, consider the following two results, r1 and r2:

r1.String scheme=uri.substring (0, 5);
r2.username=to.substring (0, to.indexOf ('@'));

The first result, r1, can be found by mapping the output to "scheme" and the input to "uri." The second result is found by mapping the output to "username" and the input to "to." Determining which results are actually relevant, rather than coincidental, may not be straightforward. To help with this process, the developer can provide additional input-output pairs to prune coincidental matches. For example "adding" an additional input-output pair can provide more clarity. For example, a second input "alex@univ.edu" and a second output "alex" can be added as a specification. This modification will remove "r1" from the result set because "r1" only matches the first input-output because the string "susie" has five characters), leaving only result "r2."

In yet another example implementation of system 100, additional variables that are not bound to particular input can be defined. As an example, the following snippet matches the input-output pair used in the example above:

int index=names.length ( )–names.indexOf (flag);

After mapping the input to names and the output to an index, it may be determined that this code is not executable because nothing is known about the value of "flag," so state-of-the-art semantic search engines that utilize test cases to identify matching code may fail to find any matches. However, system 100 can use uninitialized variables in the snippet, which also remain uninitialized in the encoding process. In addition, system 100 can use variables and make no assumptions about values that they hold, although a type inference may be used to reveal that "flag" is either a character or a string. This snippet can be identified as a match because a satisfiable model produced, for example, by solver 110 reveals that the specification matches this snippet when "flag" is set to ".txt". The solver 110 could also have identified ".", ".t", or ".tx" as possible values, but simply one of any of the above would complete the satisfiable model.

By encoding the behavior of the snippets as constraints, server 102 can identify incomplete code as a match and leverage the solver 110, for example, to guide its instantiation. Applying such guidance may yield the following, modified and complete code:

int index=names.length( )–names.indexOf (".txt");

This code would not be considered a match for other input-output examples in which the file extension is not ".txt". A working solution could be found by adding additional input-output examples and forcing "flag" to equal ".", for example. In the above examples, the system 100 treats uninstantiated variables, like "flag," as symbolic and variables that hold values, like the string ".txt", as concrete.

Figure 10:
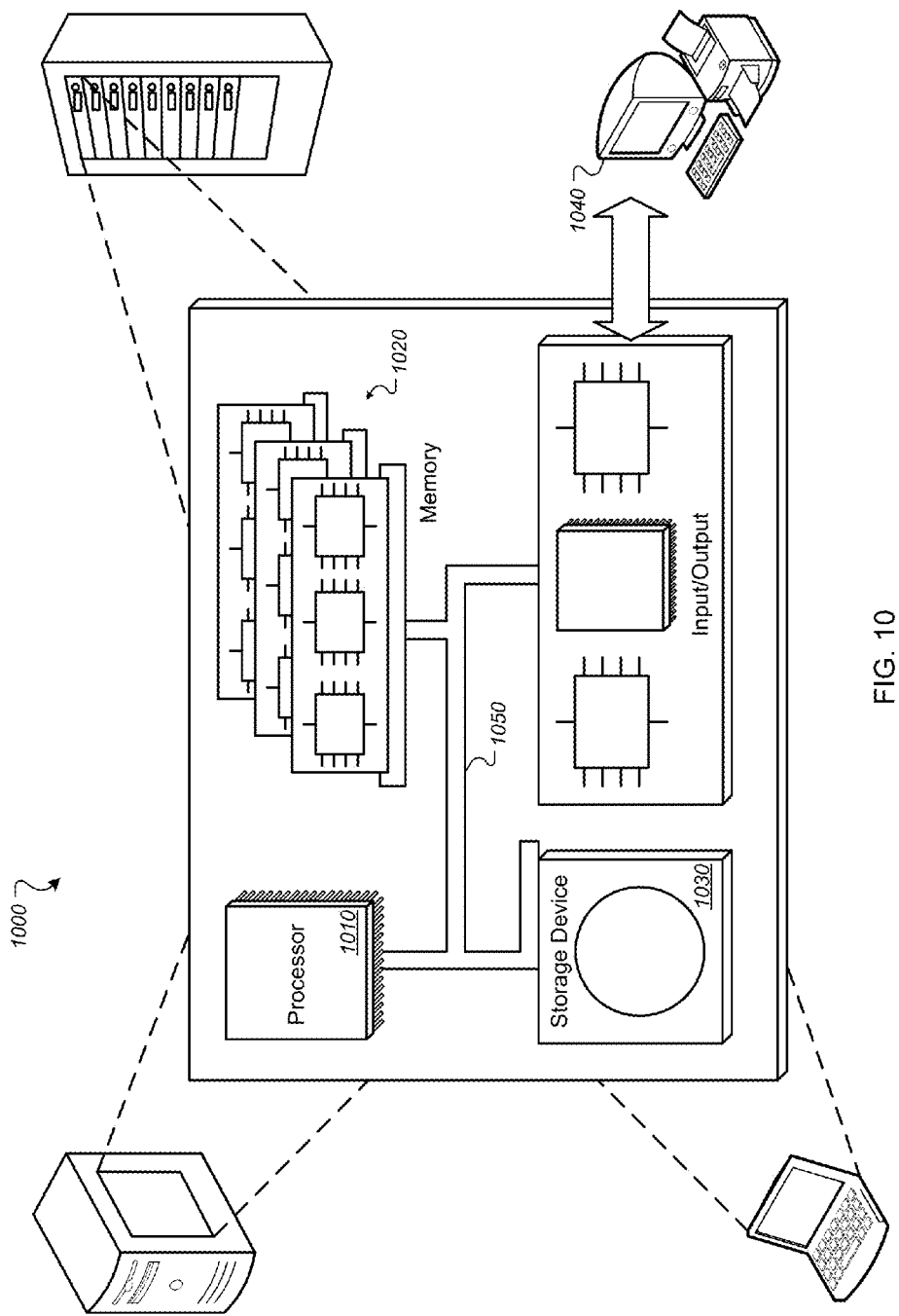
FIG. 10 is a block diagram of computing devices that may be used to implement the systems and methods described in this document.

FIG. 10 is a schematic diagram of a computing system 1000. The generic computing system 1000 can be used for the operations described in association with any of the computer-implement methods or systems described previously, according to one implementation. The generic computing system 1000 includes a processor 1010, a memory 1020, a storage device 1030, and an input/output device 1040. Each of the processor 1010, the memory 1020, the storage device 1030, and the input/output device 1040 are interconnected using a system bus 1050. The processor 1010 is capable of processing instructions for execution within the generic computing system 1000. In one implementation, the processor 1010 is a single-threaded processor. In another implementation, the processor 1010 is a multi-threaded processor. The processor 1010 is capable of processing instructions stored in the memory 1020 or on the storage device 1030 to display graphical information for a user interface on the input/output device 1040.

The memory 1020 stores information within the generic computing system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the generic computing system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the generic computing system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; cloud-based memory devices and disks, magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A computer program (also known as a program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of search queries and methods to obtain useful query results have been described, it should be recognized that numerous other applications are contemplated. Accordingly, other embodiments are within the scope of the following claims.

What is claimed is:

1. A computer implemented method of providing search results, the method comprising:
   receiving a first specification that comprises an input-output pair including a first data entity and a second data entity;
   for each module of program code of a plurality of modules of program code, supplying to a constraint solver one or more input-output constraints based on the input-output pair of the first specification and one or more code constraints based on the module of program code;
   receiving from the constraint solver, for each module of program code, a result indicating whether the code constraints based on the module of program code are satisfiable with the input-output constraints; and
   generating search results referencing one or more modules of program code having a positive result from the constraint solver and providing the search results to a user.

2. The method of claim 1, wherein the first data entity and the second data entity each comprise multiple and distinct data components.

3. The method of claim 1, further comprising automatically encoding each of the plurality of modules of program code into code constraints using symbolic analysis of at least a portion of semantics within the module of program code, wherein using symbolic analysis includes characterizing one or more behaviors of the module of program code that would be exhibited by the module when the module is executed.

4. The method of claim 1, further comprising receiving one or more additional specifications and refining the search results based on the additional specifications; and generating and providing the refined search results to the user.

5. The method of claim 1, wherein the first data entity and the second data entity are selected from the group consisting of integers, strings, Booleans, characters, files, arrays, lists, maps, and tables.

6. The method of claim 1, wherein the first data entity includes an input of a first file type and the second data entity includes an output of a second file type.

7. The method of claim 1, wherein the first data entity is a file and the second data entity is a linked list in which each node of the linked list includes content in the file and one or more additional rows of data.

8. The method of claim 1, wherein the specification is a Uniform Resource Locator (URL) and the first data entity includes one or more RSS feeds and the second data entity includes a subset of the RSS feeds that match the specification.

9. The method of claim 1, wherein the first data entity is one or more database tables and the second data entity is a portion of the one or more database tables.

10. The method of claim 1, wherein the first data entity is an extensible markup language (XML) file type and the second data entity is a Structure Query Language (SQL) file type.

11. The method of claim 1, wherein the first data entity is a file and the second data entity includes an integer and a Boolean data type.

12. A non-transitory computer-readable medium storing software comprising instructions executable by one or more computers which, upon such execution, cause the one or more computers to perform operations comprising:
    receiving a first specification that identifies program code behavior associated with a plurality of documents, wherein the specification comprises an input-output pair including a first data entity and a second data entity;
    for each module of program code of a plurality of modules of program code, supplying to a constraint solver one or more input-output constraints based on the input-output pair of the first specification and one or more code constraints based on the module of program code;
    receiving from the constraint solver, for each module of program code, a result indicating whether the code constraints based on the module of program code are satisfiable with the input-output constraints; and
    generating search results referencing one or more modules of program code having a positive result from the constraint solver and providing the search results to a user.

13. The computer-readable medium of claim 12, the operations further comprising automatically encoding each of the plurality of modules of program code into code constraints using symbolic analysis of at least a portion of semantics within the module of program code, wherein using symbolic analysis includes characterizing one or more behaviors of the module of program code that would be exhibited by the module when the module is executed.

14. The computer-readable medium of claim 12, wherein the first data entity is a file and the second data entity is a linked list in which each node of the linked list includes content in the file and one or more additional rows of data.

15. The computer-readable medium of claim 12, wherein the specification is a Uniform Resource Locator (URL) and the first data entity includes one or more RSS feeds and the second data entity includes a subset of the RSS feeds that match the specification.

16. The computer-readable medium of claim 12, wherein the first data entity is one or more database tables and the second data entity is a portion of the one or more database tables.

17. The computer-readable medium of claim 12, wherein the first data entity is an extensible markup language (XML) file type and the second data entity is a Structure Query Language (SQL) file type.

18. A system of one or more computers comprising:
a processor; and
a memory storing a plurality of instructions executable by the processor, the instructions including:
an encoder module configured to map each module of program code of a plurality of modules of program code to one or more constraints, and generate mapped program code for each module of program code, the mapping based at least in part on a predetermined behavior for the module of program code that would be exhibited by the module when the module is executed;
a solver module configured to determine whether one or more code constraints based on the mapped program code for a particular module are satisfiable by a constraint solver with one or more input-output constraints of a first specification comprising an input-output pair and identify one or more modules of program code that that have code constraints that are satisfiable with the input-output constraints; and
a refiner module configured to incrementally refine the mapped program code.

19. The electronic system of claim 18, wherein the encoder module is configured to modify an indexing scheme used by the system for indexing the modules of program code, wherein the modified indexing scheme is based on the predetermined behavior for each module of program code.

20. The electronic system of claim 18, wherein the system further comprises a constraint relaxer module configured to relax one or more constraints, and wherein the solver module is configured to identify one or more modules of program code that have relaxed code constraints relaxed by the constraint relaxer module that are satisfiable with the input-output constraints.

21. A computer implemented method of providing search results, comprising:
identifying a plurality of documents that are indexed according to a first scheme and associated with a first set of information;
generating a second scheme that associates, based on predefined mapping information, the first set of information with a second set of information;
indexing the plurality of documents according to the second scheme and storing the documents in a repository according to the second scheme;
in response to receiving a specification that comprises an input-output pair including a first data entity and a second data entity, identifying one or more modules of program code, within the plurality of documents, that have code constraints specified by the second scheme that are satisfiable by a constraint solver with one or more input-output constraints based on the input-output pair; and
generating search results referencing the one or more modules of program code that are satisfiable by the constraint solver with the input-output constraints and providing the search results to a user.

22. The method of claim 21, wherein identifying the one or more modules of program code comprises using a Satisfiability Modulo Theory (SMT) solver to iteratively determine matches between the one or more modules of program code and the input-output constraints.

23. The method of claim 21, wherein identifying the one or more modules of program code comprises determining, for each module of program code, whether using the first data entity as an input argument to the module of program code results in an output argument represented within the second data entity.

24. The method of claim 21, further comprising relaxing matching criteria for the code constraints specified by the second scheme and using a Satisfiability Modulo Theory (SMT) solver and the relaxed matching criteria to identify one or more additional modules of program code; and
generating additional search results referencing the additional modules of program code and providing the additional search results to the user.

25. The method of claim 24, wherein the additional modules represent modules that approximately match the input-output constraints.

26. The method of claim 21, wherein the first scheme is adapted to index documents according to a plurality of keywords associated with the one or more documents and the second scheme is adapted to index documents using an information hierarchy with a plurality of specifications, document indices, and lexicons for classifying details associated with an intended function of source code in the one or more documents.

* * * * *